US009244687B2

(12) United States Patent
Toll et al.

(10) Patent No.: US 9,244,687 B2
(45) Date of Patent: Jan. 26, 2016

(54) PACKED DATA OPERATION MASK COMPARISON PROCESSORS, METHODS, SYSTEMS, AND INSTRUCTIONS

(75) Inventors: Bret L. Toll, Hillsboro, OR (US); Robert Valentine, Kiryat Tivon (IL); Jesus Corbal San Adrian, Hillsboro, OR (US); Elmoustapha Ould-Ahmed-Vall, Phoenix, AZ (US); Mark Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 13/977,153

(22) PCT Filed: Dec. 29, 2011

(86) PCT No.: PCT/US2011/067972
§ 371 (c)(1),
(2), (4) Date: Jun. 28, 2013

(87) PCT Pub. No.: WO2013/101124
PCT Pub. Date: Jul. 4, 2013

(65) Prior Publication Data
US 2014/0289503 A1    Sep. 25, 2014

(51) Int. Cl.
*G06F 9/30* (2006.01)
*G06F 9/00* (2006.01)

(52) U.S. Cl.
CPC ........ *G06F 9/30189* (2013.01); *G06F 9/30018* (2013.01); *G06F 9/30029* (2013.01); *G06F 9/30036* (2013.01); *G06F 9/30094* (2013.01)

(58) Field of Classification Search
None
See application file for complete search history.

(56) References Cited

U.S. PATENT DOCUMENTS

| | | |
|---|---|---|
| 2004/0054878 A1 | 3/2004 | Debes et al. |
| 2005/0149701 A1 | 7/2005 | Chen et al. |
| 2009/0172365 A1* | 7/2009 | Orenstien ........... G06F 9/30032 712/225 |
| 2013/0219378 A1* | 8/2013 | Glaister .................. G06F 8/453 717/146 |
| 2014/0189287 A1* | 7/2014 | Plotnikov ............ G06F 9/30036 712/3 |

FOREIGN PATENT DOCUMENTS

WO    2013/101124 A1    7/2013

OTHER PUBLICATIONS

International Preliminary Report on Patentability and Written Opinion received for PCT Patent Application No. PCT/US2011/067972, mailed on Jul. 10, 2014, 7 Pages.
"Notification of Transmittal of the International Search Report and the Written Opinion of the International Searching Authority, or the Declaration" mailed Jun. 7, 2012, pp. 11, in PCT/US2011/067972.

* cited by examiner

*Primary Examiner* — Scott Sun
(74) *Attorney, Agent, or Firm* — Vecchia Patent Agent, LLC

(57) ABSTRACT

Receive packed data operation mask comparison instruction indicating first packed data operation mask having first packed data operation mask bits and second packed data operation mask having second packed data operation mask bits. Each packed data operation mask bit of first mask corresponds to a packed data operation mask bit of second mask in corresponding position. Modify first flag to first value if bitwise AND of each packed data operation mask bit of first mask with each corresponding packed data operation mask bit of second mask is zero. Otherwise modify first flag to second value. Modify second flag to third value if bitwise AND of each packed data operation mask bit of first mask with bitwise NOT of each corresponding packed data operation mask bit of second mask is zero. Otherwise modify second flag to fourth value.

25 Claims, 21 Drawing Sheets

NUMBER OF PACKED DATA
OPERATION MASK BITS
834

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS / SP | 4 | 8 | 16 |
| 64-BIT QWORDS / DP | 2 | 4 | 8 |

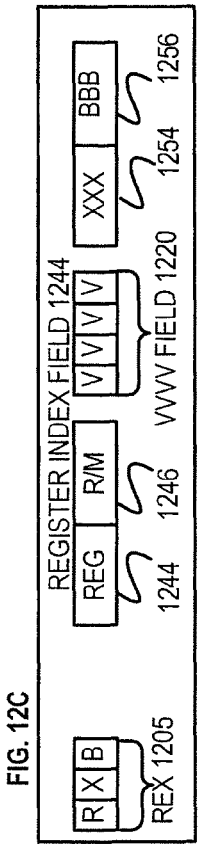
FIG. 12A
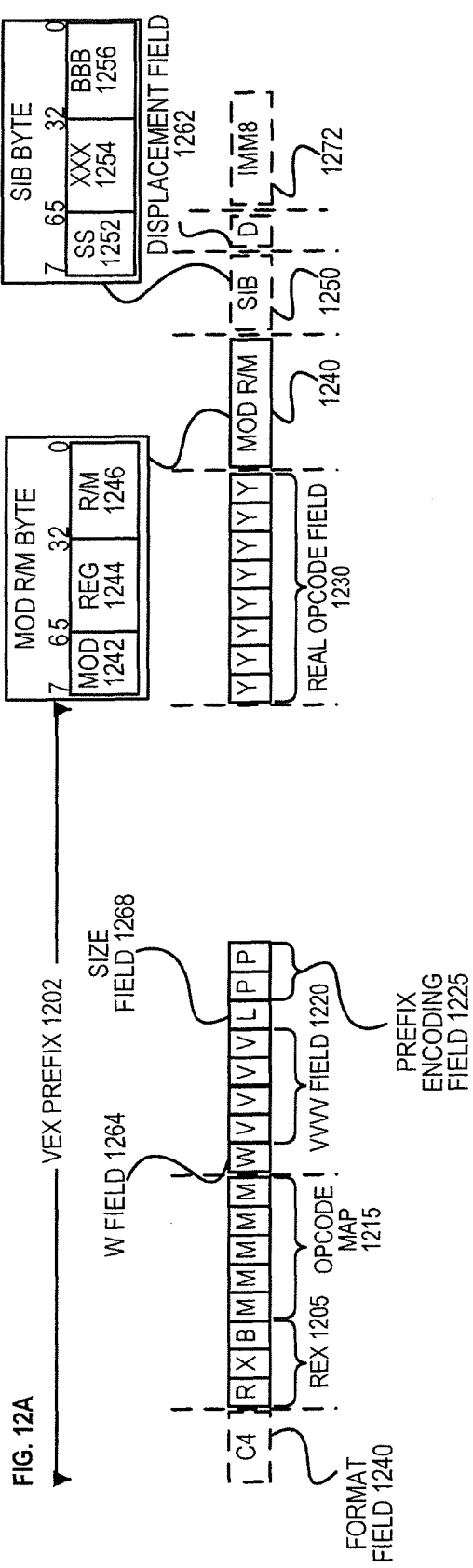
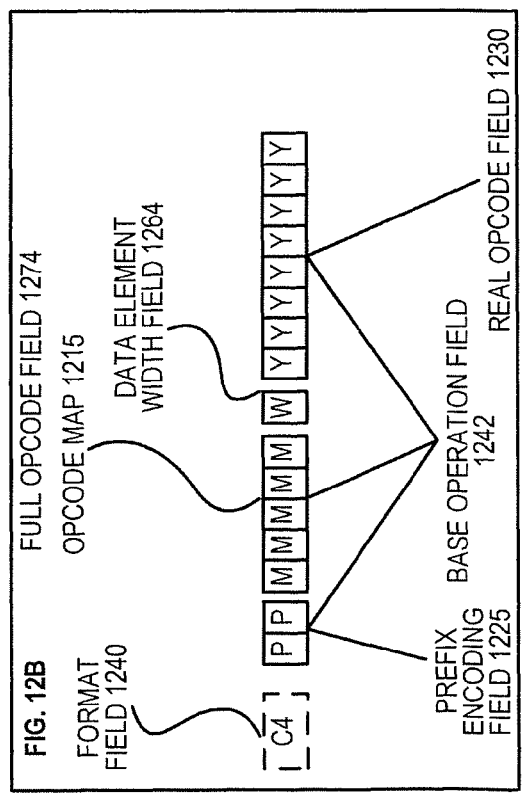
FIG. 12B
FIG. 12C

FIG. 13
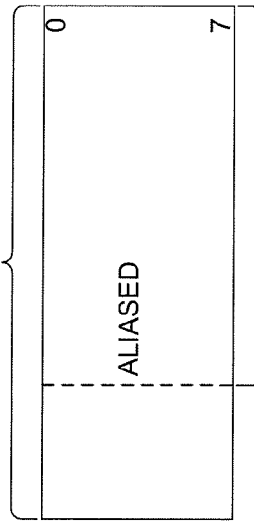
SCALAR FP STACK REGISTER FILE 1345
(X87FP)
80 BITS
ALIASED
64 BITS
MMX PACKED INT FLAT REGISTER FILE 1350
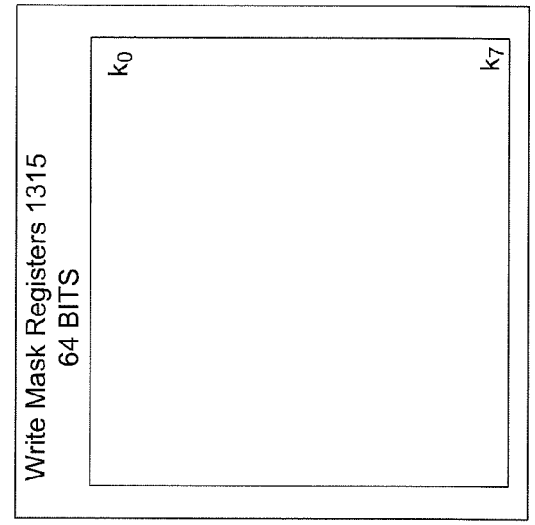
Write Mask Registers 1315
64 BITS
REGISTER ARCHITECTURE 1300
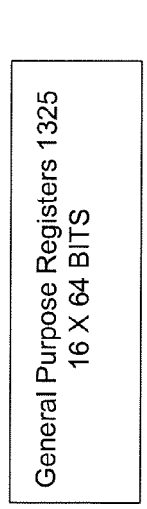
General Purpose Registers 1325
16 X 64 BITS
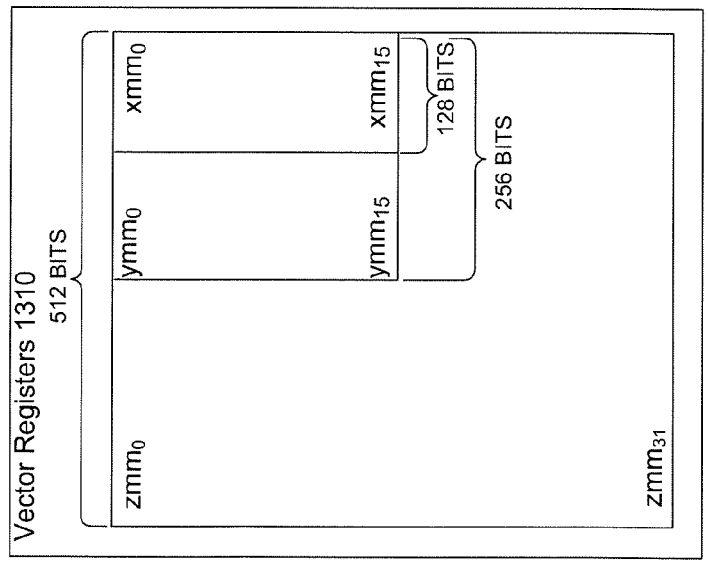
Vector Registers 1310
512 BITS
128 BITS
256 BITS

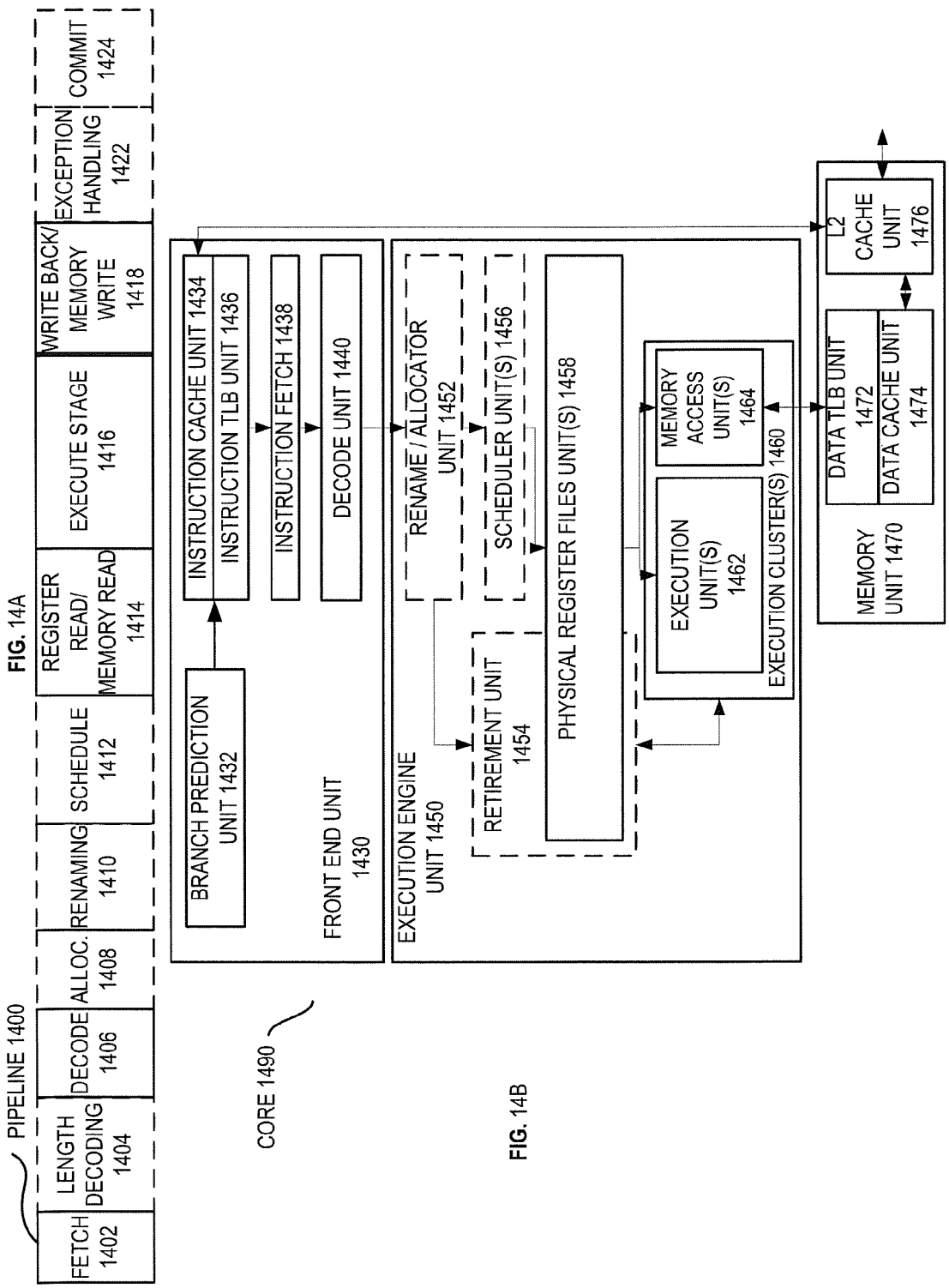

PACKED DATA OPERATION MASK COMPARISON PROCESSORS, METHODS, SYSTEMS, AND INSTRUCTIONS

CROSS-REFERENCE TO RELATED APPLICATIONS

This patent application is a U.S. National Phase Application under 35 U.S.C. §371 of International Application No. PCT/US2011/067972, filed Dec. 29, 2011, entitiled PACKED DATA OPERATION MASK COMPARISON PROCESSORS, METHODS SYSTEMS, AND INSTRUCTIONS.

BACKGROUND

1. Field

Embodiments relate to processors. In particular, embodiments relate to processors to compare packed data operation masks responsive to packed data operation mask comparison instructions.

2. Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register or memory location as packed data or vector data. In packed data, the bits of the register or other storage location may be logically divided into a sequence of data elements. For example, a 256-bit wide packed data register may have four 64-bit wide data elements, eight 32-bit data elements, sixteen 16-bit data elements, etc. Each of the data elements may represent a separate individual piece of data (e.g., a pixel color, a component of a complex number, etc.), which may be operated upon separately and/or independently of the others.

BRIEF DESCRIPTION OF THE SEVERAL VIEWS OF THE DRAWINGS

The invention may best be understood by referring to the following description and accompanying drawings that are used to illustrate embodiments of the invention.

In the drawings:

FIG. 12A illustrates an exemplary AVX instruction format including a VEX prefix, real opcode field, Mod R/M byte, SIB byte, displacement field, and IMM8.

FIG. 12B illustrates which fields from FIG. 12A make up a full opcode field and a base operation field.

FIG. 12C illustrates which fields from FIG. 12A make up a register index field.

FIG. 13 is a block diagram of a register architecture 1300 according to one embodiment of the invention.

FIG. 14A a processor pipeline includes a fetch stage, a length decode stage, a decode stage, an allocation stage, a renaming stage, a scheduling (also known as a dispatch or issue) stage, a register read/memory read stage, an execute stage, a write back/memory write stage, an exception handling stage, and a commit stage.

FIG. 14B shows processor core including a front end unit coupled to an execution engine unit, and both are coupled to a memory unit.

DETAILED DESCRIPTION

Disclosed herein are packed data operation mask comparison instructions, processors to execute the packed data operation mask comparison instructions, methods performed by the processors when processing or executing the packed data operation mask comparison instructions, and systems incorporating one or more processors to process or execute the packed data operation mask comparison instructions. In the following description, numerous specific details are set forth (e.g., specific processor configurations, sequences of operations, data formats, instruction formats, microarchitectural details, etc.). However, embodiments may be practiced without these specific details. In other instances, well-known circuits, structures and techniques have not been shown in detail to avoid obscuring the understanding of the description.

Figure 1:
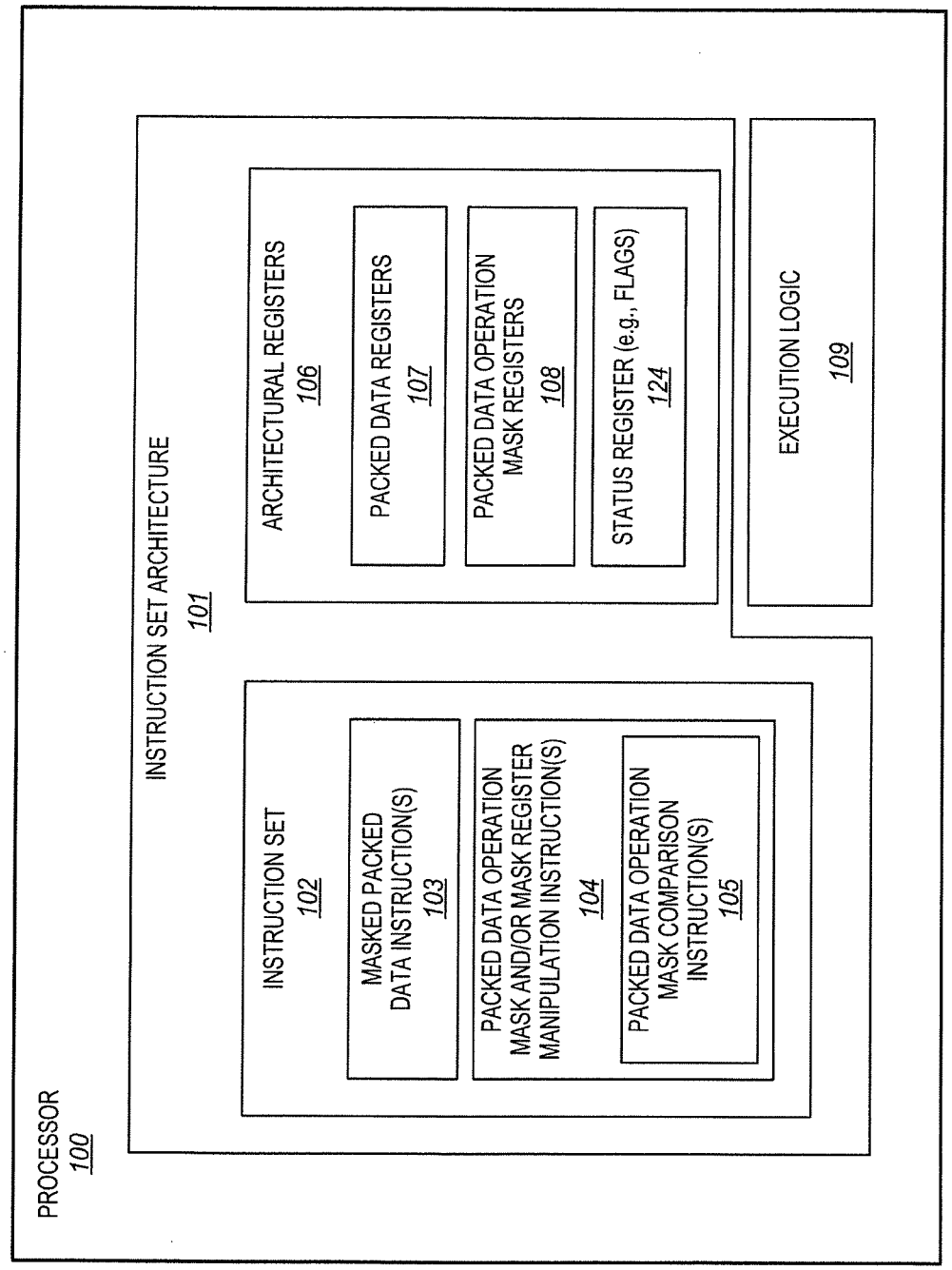
FIG. 1 is a block diagram of an embodiment of a processor having an instruction set that includes one or more packed data operation mask comparison instructions.

FIG. 1 is a block diagram of an embodiment of a processor 100 having an instruction set 102 that includes one or more packed data operation mask comparison instructions 105. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor has an instruction set architecture (ISA) 101. The ISA represents a part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA. Processors with different microarchitectures may share a common ISA.

The ISA includes architecturally-visible registers (e.g., an architectural register file) 106. The architectural registers generally represent on-die processor storage locations. Unless otherwise specified or apparent, the phrases architectural register, register file, and register are used herein to refer to registers that are visible to the software and/or programmer (e.g., software-visible) and/or the registers that are specified by general-purpose macroinstructions to identify operands. These registers are contrasted to other non-architectural or non-architecturally visible registers in a given microarchitecture (e.g., temporary registers used by instructions, reorder buffers, retirement registers, etc.). The architectural registers may also be referred to herein simply as registers. The architectural registers include packed data registers 107. Each of the packed data registers is operable to store packed data, vector data, or SIMD data. The architectural registers also include packed data operation mask registers 108. Each of the packed data operation mask registers is operable to store a packed data operation mask. The architectural registers also include status register (e.g., having one or more processor status flags).

The illustrated ISA includes an instruction set 102 that is supported by the processor. The instructions of the instruction set represent macroinstructions (e.g., instructions provided to the processor for execution), as opposed to microinstructions or micro-ops (e.g., those which result from a decoder of the processor decoding macroinstructions). The instruction set includes one or more masked packed data instructions 103.

Each of the masked packed data instructions may be operable to cause or result in the processor performing a packed data operation on data elements of one or more packed data operands that are indicated by the instruction. The packed data operands may be stored in the packed data registers 107. However, each of the masked packed data instructions may use one or more packed data operation masks (e.g., in packed data operation mask registers 108) to mask, predicate, or conditionally control the packed data processing. The packed data operation masks and/or mask registers may represent mask operands, predicate operands, or conditional operation control operands.

The packed data operation masks and/or mask registers may be operable to mask or conditionally control packed data processing at per-data element granularity. For example, the packed data operation masks may be operable to mask whether or not a result of a packed data operation of the masked packed data instruction, performed on individual data elements from a single source packed data operand or individual pairs of corresponding data elements from two source packed data operands, is to be stored in a packed data result. The masked packed data instructions may allow packed data processing of each data element or pair of corresponding data elements to be predicated or conditionally controlled separately and independently of the data elements. The masked packed data instructions, operations, and masks may offer certain advantages, such as, for example, increased code density and/or higher instruction throughput.

Referring again to FIG. 1, the instruction set also includes one or more packed data operation mask and/or mask register manipulation instructions 104. Each of the packed data operation mask and/or mask register manipulation instructions may be operable to cause or result in the processor manipulating or operating on one or more packed data operation mask registers 108 and/or masks. As shown, the packed data operation mask and/or mask register manipulation instructions may include one or more packed data operation mask comparison instructions 105. Each of the packed data operation mask comparison instructions 105 may be operable to cause or result in the processor performing logical comparisons between a plurality of the packed data operation masks and/or mask registers.

The processor also includes execution logic 109. The execution logic is operable to execute or process the instructions of the instruction set (e.g., the packed data operation mask comparison instructions). The execution logic may include execution units, arithmetic logic units, logic units, functional units, etc.

Figure 2A:
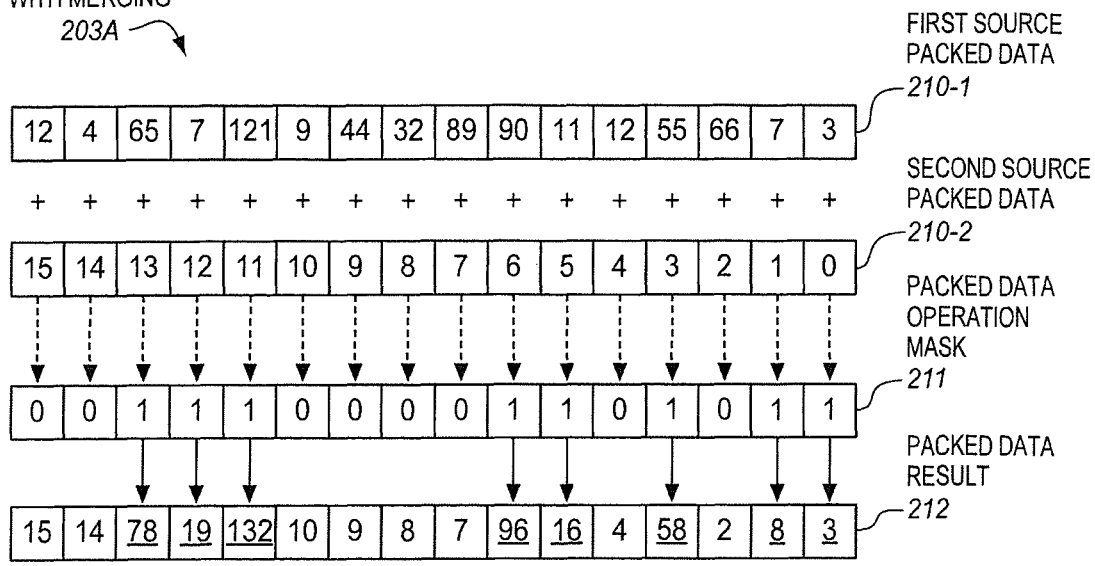
FIG. 2A is a block diagram illustrating a first representative example embodiment of a masked packed data operation with merging.

To further illustrate packed data operation masks, it may be helpful to consider an example of their use. FIG. 2A is a block diagram illustrating a first representative example embodiment of a masked packed data operation with merging 203A. The masked packed data operation may be performed in response to, or as a result of, a masked packed data instruction (e.g., one of the masked packed data instructions 103 of FIG. 1).

The instruction for the illustrated masked packed data operation indicates a first source packed data 210-1 and a second source packed data 210-2. Other masked packed data instructions may indicate only a single source packed data, or more than two source packed data. In the illustration, the first and second source packed data are of the same size, contain data elements of the same width, and thus each contain the same number of data elements. In the illustration, each of the first and second source packed data have sixteen data elements. As one example, the first and second source packed data may each be 512-bits wide and may each include sixteen 32-bit doubleword data elements. The source data elements in the same bit positions in the two source packed data (e.g., in the same vertical positions) represent pairs of corresponding data elements. Each of the data elements has a numerical value shown within the block representing the data element. For example, the lowest order data element (on the right) of the first source packed data has a value of 3, the next-to-lowest order data element of the first source packed data has a value of 7, the highest-order data element (on the left) of the first source packed data has a value of 12, etc.

The instruction of the masked packed data operation also indicates a packed data operation mask 211. The packed data operation mask includes multiple mask elements, predicate elements, conditional control elements, or bits. The elements or bits may be included in a one-to-one correspondence with one or more corresponding source data elements. For example, as shown in the illustration, there may be one such element or bits for each pair of corresponding source data elements in the case of the operation involving two source packed data operands. Each element or bits of the packed data operation mask may be operable to mask a separate packed data operation on the one or more corresponding source packed data elements. For example, in this example, each element or bits may mask a separate packed data operation on a pair of corresponding source packed data elements.

As shown in the illustration, commonly each may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each mask element. In the illustration, the packed data operation mask includes sixteen bits (i.e., 0011100001101011). Each of the sixteen bits has an ordered correspondence to one of the sixteen pairs of corresponding data elements of the first and second packed data. For example, the lowest-order bit of the mask corresponds to the pair of corresponding lowest-order data elements of the first and second packed data, the highest-order bit of the mask corresponding to the pair of corresponding highest-order data elements, etc. In alternate embodiments, where the source packed data have either less or more data elements, the packed data operation mask may similarly have either less or more data elements.

The particular illustrated masked packed data operation is a masked packed data addition operation that is operable to conditionally store sums of pairs of corresponding data elements from the first and second source packed data 210-1, 210-2 in the packed data result 212 in accordance with the conditional operation control or predication provided by the corresponding bits of the packed data operation mask 211. This particular masked packed data addition operation specifies that a single operation (in this case addition) is to be conditionally performed in a vertical fashion on each pair of corresponding data elements separately or independently of the other pairs. The destination operand or packed data result is of the same size as the source packed data and has the same number of data elements as the source packed data. Accordingly, each pair of corresponding source data elements has a corresponding result data element in the same bit positions of the packed data result as their corresponding pair of source data elements in the source packed data.

Referring again to the packed data operation mask 211, each of the sixteen bits of the packed data operation mask is either set (i.e., has a binary value of 1) or is cleared (i.e., has a binary value of 0). According to the illustrated convention, each bit is set (i.e., 1) or cleared (i.e., 0), respectively, to allow or not allow a result of the packed data operation, performed on a corresponding pair of data elements of the first and second source packed data, to be stored in a corresponding data element of the packed data result. For example, the next-to-lowest-order bit in the packed data operation mask is set (i.e., 1), and the sum (i.e., 8) representing the result of the packed data addition operation performed on the pair of corresponding next-to-lowest-order data elements (i.e., 7+1) is stored in the corresponding next-to-lowest-order data element of the packed data result. In the illustration, the sums are underlined.

Conversely, when the given bit is cleared (i.e., 0), then a result of a packed data operation on a corresponding pair of data elements is not allowed to be stored in the corresponding data element of the packed data result. Rather, another value may be stored in the result data element. For example, as shown in the illustration, the value of the corresponding data element from the second source packed data may be stored in the corresponding data element of the packed data result. For example, the highest-order bit in the packed data operation mask is cleared (i.e., 0), and the numerical value (i.e., 15) of the highest-order data element from the second source packed data is stored in the highest-order data element of the packed data result. This is referred to as merging-masking. An opposite convention to that illustrated is also possible where bits are cleared (i.e., 0) to allow the results to be stored, or set (i.e., 1) to not allow the results to be stored.

In some embodiments, the packed data operation may optionally be performed on all corresponding pairs of data elements of the first and second source packed data regardless of whether the corresponding bits of the packed data operation mask are set or cleared, but the results of the packed data operation may or may not be stored in the packed data result depending upon whether the corresponding bits of the packed data operation mask are set or cleared. Alternatively, in another embodiment, the packed data operation may optionally be omitted (i.e., not performed) if the corresponding bit of the packed data operation mask specifies that the result of the operation is not to be stored in the packed data result operation. In some embodiments, exceptions (e.g., exception flags) or violations may optionally be suppressed or not raised by a packed data operation on a masked-off element. In some embodiments, for masked packed data instructions with a memory operand, memory faults may optionally be suppressed for masked-off data elements. This feature may help to implement control-flow predication, since the mask may in effect provide a merging behavior packed data registers, but is not required.

Figure 2B:
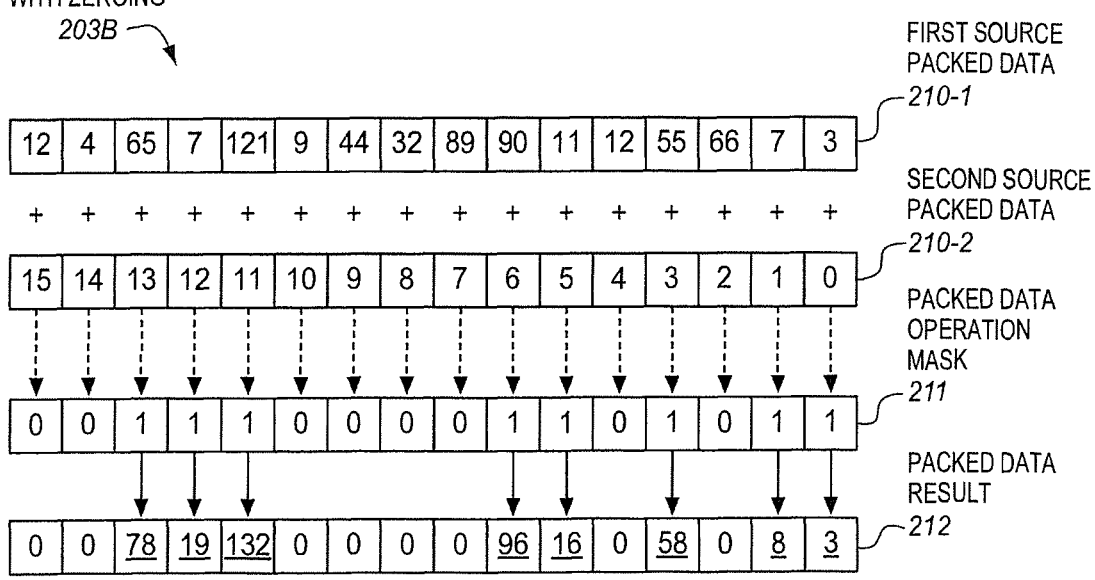
FIG. 2B is a block diagram illustrating a second representative example embodiment of a masked packed data operation with zeroing.

FIG. 2B is a block diagram illustrating a second representative example embodiment of a masked packed data operation with zeroing 203B. The masked packed data operation with zeroing is similar to the aforementioned masked packed data operation with merging. To avoid obscuring the description, the similarities will not be repeated, but rather, the differences will primarily be mentioned. One notable difference is that, instead of merging or storing values of data elements of a source packed data (e.g., the second source packed data 210-2 in FIG. 2A) into the corresponding data elements of the packed data result, when the corresponding bits of the packed data result are masked off (e.g., cleared to 0), the corresponding data elements of the packed data result may be zeroed out. For example, all 32-bits of a doubleword result packed data element may have a value of zero. This is referred to as zeroing-masking. Alternatively, other predetermined values besides zero may optionally be used in other embodiments.

It is to be appreciated that a processor may potentially support a wide variety of different types of masked packed data operations. For example, these may include those that have only one, or have more than two, source packed data, those that generate a result packed data of a different size, those that have different sized data elements, and/or those that have a different result data element order, and combinations thereof.

Figure 3:
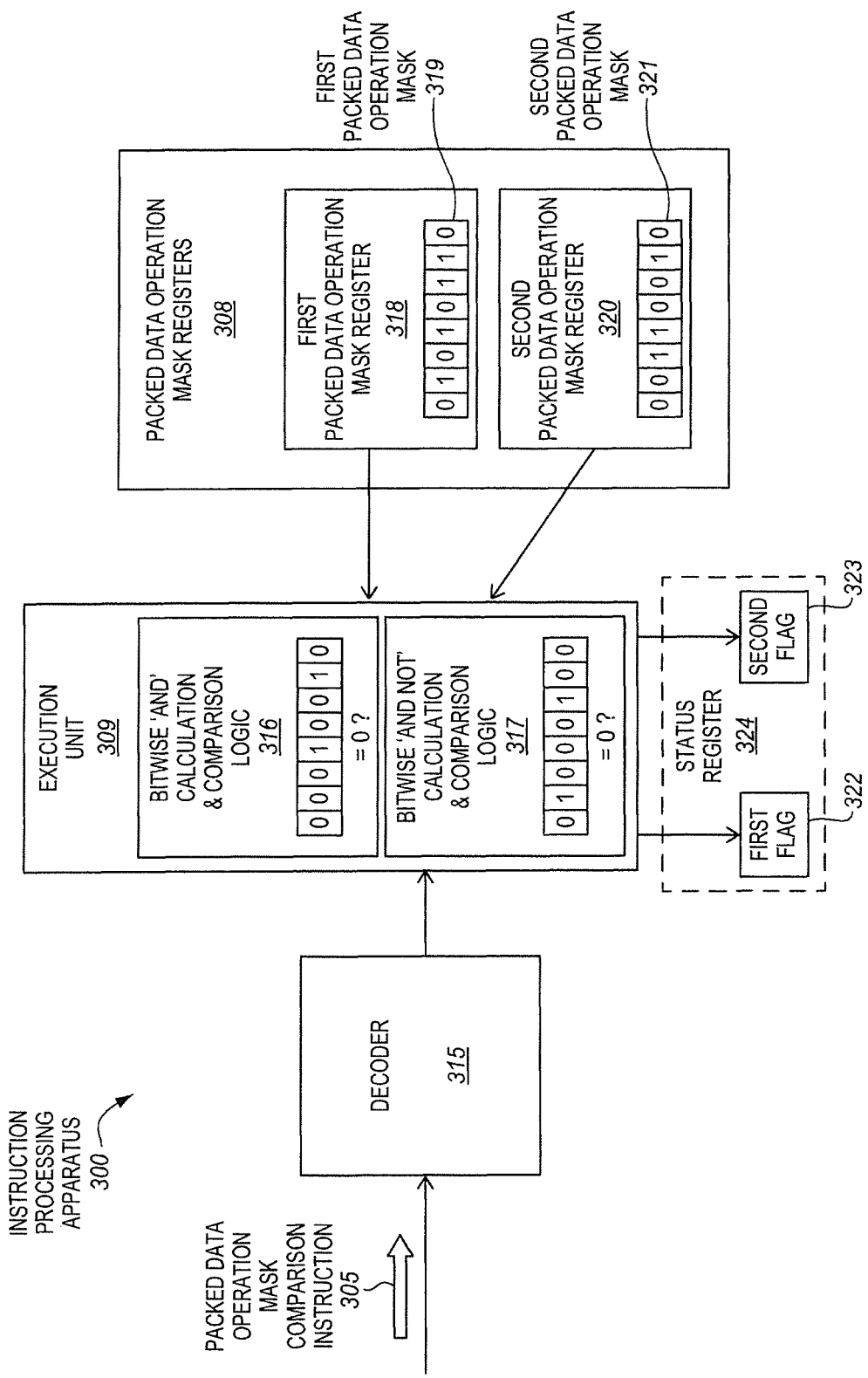
FIG. 3 is a block diagram of an embodiment of an instruction processing apparatus having an execution unit that is operable to execute instructions including an embodiment of a packed data operation mask comparison instruction.

FIG. 3 is a block diagram of an embodiment of an instruction processing apparatus 300 having an execution unit 309 that is operable to execute instructions including an embodiment of a packed data operation mask comparison instruction 305. In some embodiments, the instruction processing apparatus may be a processor and/or may be included in a processor. For example, in some embodiments, the instruction processing apparatus may be, or may be included in, the processor 100 of FIG. 1, or one similar. Alternatively, the instruction processing apparatus may be included in a different processor, or electronic system.

The instruction processing apparatus 300 may receive the packed data operation mask comparison instruction 305. For example, the instruction may be received from an instruction fetch unit, an instruction queue, or a memory. The packed data operation mask comparison instruction may represent a machine instruction, macroinstruction, or control signal that is recognized by the instruction processing apparatus and that controls the apparatus to perform a particular operation. The packed data operation mask comparison instruction may explicitly specify (e.g., through bits or one or more fields) or otherwise indicate (e.g., implicitly indicate) a first packed data operation mask register 318 having a first packed data operation mask 319 having a first plurality of packed data operation mask bits (e.g., as shown in the illustration in one example 01010110). The packed data operation mask comparison instruction may also explicitly specify (e.g., through bits or one or more fields) or otherwise indicate (e.g., implicitly indicate) a second packed data operation mask register 320 having a second packed data operation mask 321 having a second plurality of packed data operation mask bits (e.g., as shown in the illustration in one example 00110010). Each packed data operation mask bit of the first packed data operation mask register may correspond to a packed data operation mask bit of the second packed data operation mask register in a corresponding position to form pairs of corresponding mask bits. In the drawing, for simplicity of illustration, each of the first and second packed data operation masks is eight bits, although they may alternatively be another number of bits (e.g., sixteen bits, thirty-two bits, sixty-four bits, etc.).

The illustrated instruction processing apparatus includes an instruction decode unit or decoder 315. The decoder may receive and decode higher-level machine instructions or macroinstructions, and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, instead of having the decoder 315, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction, emulate, translate, morph, interpret, or otherwise convert the received instruction into one or more corresponding derived instructions or control signals. In still other embodiments, both instruction conversion logic and a decoder may be used. For example, the apparatus may have instruction conversion logic to convert the received instruction into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 3, the instruction processing apparatus also includes a first packed data operation mask register 318 that is operable to store a first packed data operation mask 319 and a second packed data operation mask register 320 that is operable to store a second packed data operation mask 321. As previously mentioned, the instruction may explicitly specify (e.g., through bits or one or more fields) or otherwise indicate the first packed data operation mask and/or mask register and the second packed data operation mask and/or mask register. In some embodiments, the first and second packed data operation mask registers may be among a set of packed data operation mask registers (e.g., a register file) 308.

The packed data operation mask registers may each represent an on-board processor storage location. The packed data operation mask registers may represent architectural registers. The packed data operation mask registers may be visible to the software and/or programmer (e.g., software-visible) and/or may be registers that are indicated or specified by macroinstructions (e.g., the packed data operation mask comparison instruction) to identify operands. The packed data operation mask registers may be implemented in different ways in different microarchitectures using well known techniques and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The instruction processing apparatus also includes the execution unit 309. The execution unit is coupled with the first and second packed data operation mask registers. The execution unit has a first input to receive the first packed data operation mask and a second input to receive the second packed data operation mask. The execution unit is also coupled with the decoder. The execution unit may receive from the decoder one or more micro-operations, micro-code entry points, microinstructions, other instructions, or other control signals, which reflect, or are derived from, the packed data operation mask comparison instruction. By way of example, the execution unit 309 may include an arithmetic logic unit, logic unit, functional unit, or the like. The execution unit and/or the apparatus may include specific or particular logic (e.g., circuitry or other hardware potentially combined with software and/or firmware) operable to execute and/or process the packed data operation mask comparison instruction and implement the instructions operations in response to the instruction (e.g., in response to one or more microinstructions or other control signals derived from the instruction).

The execution unit is also coupled with a first flag 322 and a second flag 323. Processors and other instruction processing apparatus commonly have flags. Each of the flags commonly represents one, two, or a few bits, or a value, which is architecturally-visible (e.g., visible to application programs), and which is commonly used to record information about processor status, state, condition, or the outcome of an operation, etc. In certain processors, many of the flags are a single bit. Without limitation, multiple flags may be stored in a common register, such as, for example, a status register, a flags register, or a condition code register, although this is not required. Alternatively, the flags may be physically dispersed among multiple registers, discrete bits, or other separated storage locations.

The carry flag is a well-known type of architectural or status flag commonly found in processors. The carry flag is commonly used to indicate whether or not there is overflow in an arithmetic operation. For example, the carry flag may be a single bit that may have a first value (e.g., a binary value of 1) if there is overflow, such as a carry or borrow out of the most-significant bit of the result in an arithmetic operation, or the carry flag may otherwise have a second value (e.g., a binary value of 0) if there is no such overflow.

The zero flag is another well-known type of architectural or status flag commonly found in processors. The zero flag is commonly used to indicate results of arithmetic and/or logical operations. For example, the zero flag may be a single bit that may have a first value (e.g., a binary value of 1) if an arithmetic result is zero, or the zero flag may otherwise have a second value (e.g., a binary value of 0). The zero flag is also commonly used in processors for conditional branching.

The execution unit is operable, in response to and/or as a result of the packed data operation mask comparison instruction, to modify the first flag 322 or other first architecturally-visible processor state element. In some embodiments, the first flag is a zero flag, although this is not required. Other flags may alternatively be used. The first flag 322 or other first architecturally-visible processor state element may be modified to a first value if a bitwise AND of each packed data operation mask bit of the first packed data operation mask register 318 with each corresponding packed data operation mask bit of the second packed data operation mask register 320 is zero. Otherwise, the first flag 322 or other first architecturally-visible processor state element may be modified to a second value (e.g., responsive to determining that at least one of the result bits of the AND operation is non-zero). In some embodiments, the first value is binary one and the second value is binary zero, although this is just one possible convention and is not required.

The bitwise AND operation may operate the first and second masks at the level of their individual packed data operation mask bits or at a packed data operation mask bit-level granularity. The bitwise AND operation may perform a logical AND operation on pairs of corresponding packed data operation mask bits. For each pair of corresponding bits, a single result bit may be stored. In a bitwise AND operation, the single result bit is binary one (i.e., 1) only if both of the bits of the corresponding pair are also binary one (i.e., 1), otherwise the single result bit is binary zero (i.e., 0). By way of example, 01010110 bitwise AND 00110010=00010010.

As shown in the illustration, the execution unit may include bitwise AND calculation and comparison logic 316. In the illustration, an example of the bitwise AND result (e.g., 00010010) between the first packed data operation mask 318 bits (e.g., 01010110) and the second packed data operation mask 320 bits (e.g., 00110010) is shown. The logic may also determine if all of the bits of the bitwise AND result are all zero bits. A first flag or architecturally-visible state element may be modified based on the comparison. In some embodiments, according to one possible convention, if all the result bits are equal to zero (e.g., representing a logical-low value), then the first flag (e.g., the zero flag) may be set to a true value of binary one (e.g., representing a logical-high value). However, if even one result bit is binary one (e.g., representing a logical-high value), then the first flag (e.g., the zero flag) may be set to a false value of binary zero (e.g., representing a logical-low value). In the example in the illustration, the zero flag may be set to binary zero because two of the result bits in the expression "00010010" are binary one.

The execution unit is also operable, in response to and/or as a result of the packed data operation mask comparison instruction, to modify a second flag 323 or other second architecturally-visible processor state element. In some embodiments, the second flag is a carry flag, although this is not required. Other flags may alternatively be used. The second flag 323 or other second architecturally-visible processor state element may be modified to a third value if a bitwise AND of each packed data operation mask bit of the first packed data operation mask register with a bitwise NOT (or a complement) of each corresponding packed data operation mask bit of the second packed data operation mask register is zero. Otherwise, the second flag 323 or other second architecturally-visible processor state element may be modified to a fourth value. In some embodiments, the third value is binary one and the fourth value is binary zero, although this is just one possible convention and is not required.

A bitwise NOT may perform a logical NOT operation on the individual packed data operation mask bits. The bitwise NOT operation is sometimes referred to as a complement operation or inverse operation. The bitwise NOT operation is a unary operation which operates on a single operand (e.g., in this case the second packed data operation mask) and which performs a logical negation of each bit and/or forms the ones complement of the binary value of each bit. For example, binary digits that were 0 are changed to 1, and binary digits that were 1 are changed to 0. By way of example, bitwise NOT 00110010=11001101.

As shown in the illustration, the execution unit may include bitwise AND NOT calculation and comparison logic 317. In the illustration, an example of the bitwise AND NOT result (e.g., 01000100) between the first packed data operation mask 318 bits (e.g., 01010110) and the second packed data operation mask 320 bits (e.g., 00110010) is shown. The logic may also determine if all of the bits of the bitwise AND NOT result are all zero bits. A second flag or architecturally-visible state element may be modified based on the comparison. In some embodiments, according to one possible convention, if all the result bits are equal to zero (e.g., representing a logical-low value), then the second flag (e.g., the carry flag) may be set to a true value of binary one (e.g., representing a logical-high value). However, if even one result bit is binary one (e.g., representing a logical-high value), then the second flag (e.g., the carry flag) may be set to a false value of binary zero (e.g., representing a logical-low value). In the example in the illustration, the carry flag may be set to binary zero because two of the result bits in the expression "01000100" are binary one. Modifying flags is a convenient, but not the only way, to record the outcomes of the comparisons. ISAs often include existing conditional jump, branch, or other instructions already designed to check flags to make program flow decisions. Other approaches may introduce new flags, may use other architecturally visible storage locations (e.g., general-purpose registers, mask registers, etc.) to store the results, may use signals to indicate the results, etc.

In some embodiments, the first and second packed data operation masks have the same size in bits (e.g., both 8-bits, 16-bits, 32-bits, or 64-bits), although this is not required. In some embodiments, the size of the packed data operation masks may be implicit to the packed data operation mask comparison instruction (e.g., implicit to an opcode of the instruction). In some embodiments, an instruction set may include a different packed data operation mask comparison instruction for each of multiple different sizes of packed data operation masks (e.g., one instruction for 8-bit masks, another instruction for 16-bit masks, yet another instruction for 32-bit masks, etc.). The packed data operation mask registers and/or the sources may be at least as large as, or optionally larger than, the largest size packed data operation mask. In one example, the packed data operation mask registers may be 64-bits wide, although this is not required. The packed data operation masks may contain the active bits, utilized bits, or meaningful bits of the packed data operation mask register, whereas the remaining bits of the packed data operation mask registers not used for the packed data operation masks may represent non-active bits, un-utilized bits, un-meaningful bits, or extraneous bits. In some embodiments, neither the first packed data operation mask nor the second packed data operation mask are modified as a result of the instruction/operation.

In some embodiments, the execution unit may be further responsive to the instruction to modify a plurality of other flags (not shown), or a plurality of other processor state elements, although this is not required. For example, in some embodiments, the method may include clearing or setting to binary zero at least a plurality of, or all of, a sign flag, a parity flag, an overflow flag, and an adjust flag, although this is not required. In some embodiments, these flags may be cleared regardless of the outcome of the comparisons. This list of flags is illustrative only and is not required. Alternate embodiments may modify fewer, more, or different flags.

To avoid obscuring the description, a relatively simple instruction processing apparatus has been shown and described. In other embodiments, the instruction processing apparatus may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An execution unit operable to execute an embodiment of an instruction disclosed herein may be included in at least one, at least two, most, or all of the cores, logical processors, or execution engines. There are literally numerous different combinations and configurations of components in processors, and embodiments are not limited to any particular combination or configuration.

Figure 4:
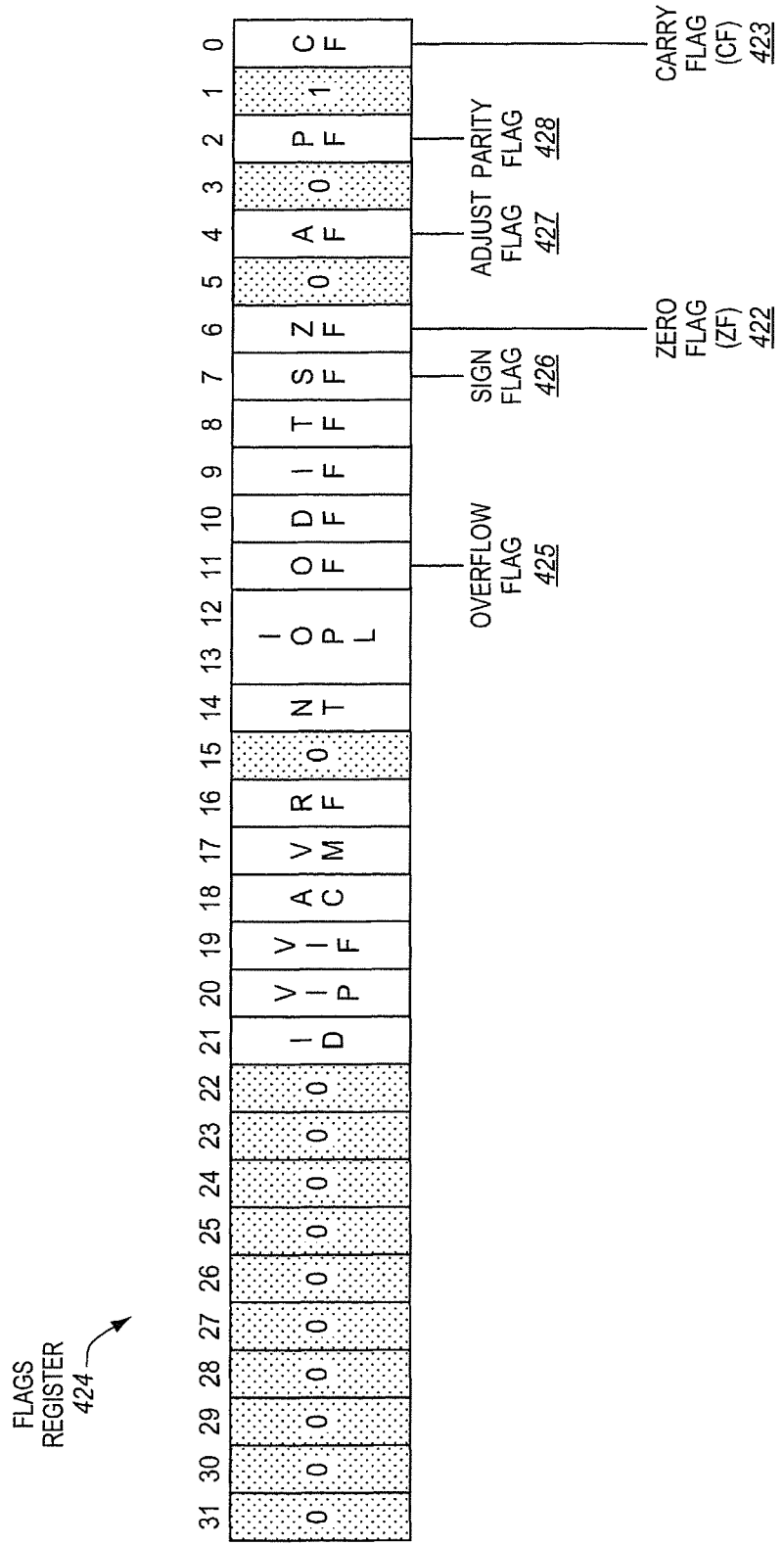
FIG. 4 illustrates an example embodiment of a flags register having architectural flags.

FIG. 4 illustrates an example embodiment of a flags register 424 having a number of architectural flags. The illustrated flags register is known as the EFLAGS register found in the x86 architecture. The EFLAGS register is a 32-bit register that includes a group of status flags, a control flag, and a group of system flags. The status flags include a carry flag (CF, bit 0), a parity flag (PF, bit 2), an auxiliary carry flag (AF, bit 4), a zero flag (ZF, bit 6), a sign flag (SF, bit 7), and an overflow flag (OF, bit 11). As previously mentioned, in some embodiments, the carry flag (CF) 423 and the zero flag (ZF) 422 may be used to record results of comparisons for the packed data operation mask and/or mask register comparison instructions disclosed herein. Alternatively, other flags or other architecturally-visible storage locations or status elements may be used instead of, or in addition to, these flags.

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved. The EFLAGS register is the successor to an earlier 16-bit FLAGS register. Additionally, the EFLAGS register, in 64-bit mode processors, has been succeeded and extended to 64-bits by an RFLAGS register. The lower 32-bits of RFLAGS is the same as EFLAGS. The EFLAGS register is one particular example embodiment of a register having suitable flags for implementing one or more embodiments, although this particular register and these particular flags are certainly not required. Additional description of the EFLAGS/RFLAGS registers, and the carry flag, if desired, is available in Intel® 64 and IA-32 Architectures Software Developer's Manual, Volume 1: Basic Architecture, Order Number: 253665-032US, September 2009.

Figure 5A:
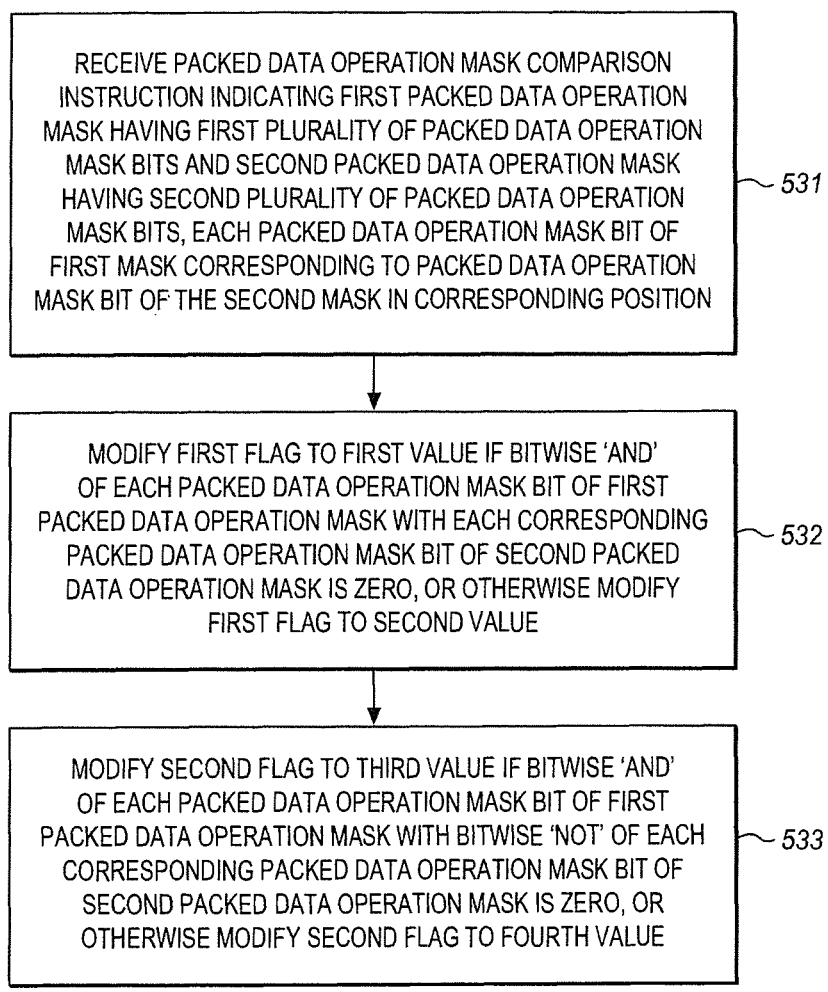
FIG. 5A is a block flow diagram of an embodiment of a method of processing an example embodiment of a packed data operation mask comparison instruction.

FIG. 5A is a block flow diagram of an embodiment of a method 530 of processing an example embodiment of a packed data operation mask comparison instruction. In various embodiments, the method may be performed by a general-purpose processor, a special-purpose processor (e.g., a graphics processor or a digital signal processor), or another type of digital logic device or instruction processing apparatus. In some embodiments, the method 530 may be performed by the processor 100 of FIG. 1, or the instruction processing apparatus 300 of FIG. 3, or a similar processor or instruction processing apparatus. Alternatively, the method 530 may be performed by different embodiments of processors or instruction processing apparatus. Moreover, the processor 100, and the instruction processing apparatus 300, may perform embodiments of operations and methods either the same as, similar to, or different than those of the method 530.

The method includes receiving the packed data operation mask comparison instruction, at block 531. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

The packed data operation mask comparison instruction specifies or otherwise indicates a first packed data operation mask having a first plurality of packed data operation mask bits, and specifies or otherwise indicates a second packed data operation mask having a second plurality of packed data operation mask bits. Each packed data operation mask bit of the first packed data operation mask corresponds to a different packed data operation mask bit of the second packed data operation mask in a corresponding position. In some embodiments, each of the first and second packed data operation masks is one of eight bits, sixteen bits, thirty-two bits, and sixty-four bits.

In response to and/or as a result of the packed data operation mask comparison instruction, a first flag, or other first architecturally visible processor state element, is modified, at block 532. In some embodiments, the first flag is a zero flag, although this is not required. Other flags may alternatively be used. The first flag, or other first processor state element, is modified to a first value if a bitwise AND of each packed data operation mask bit of the first packed data operation mask with each corresponding packed data operation mask bit of the second packed data operation mask is zero. Otherwise, the first flag, or other first processor state element, is modified to a second value, which is different than the first value. In some embodiments, the first value is binary one and the second value is binary zero, although this is just one possible convention and is not required. In such an embodiment, the result of the comparison will be false (e.g., the carry flag will be cleared to binary 0) if at least one of the bits set to binary one (i.e., 1) in one of the sources has a corresponding bit in the other source that is also set to binary one (i.e., 1). A state of the processor or apparatus is modified based on the result of the comparison at block 532.

Moreover, in response to and/or as a result of the packed data operation mask comparison instruction, a second flag, or other second architecturally visible processor state element, is modified, at block 533. In some embodiments, the second flag is a carry flag, although this is not required. Other flags may alternatively be used. The second flag, or other second processor state element, is modified to a third value if a bitwise AND of each packed data operation mask bit of the first packed data operation mask with a bitwise NOT (or a complement) of each corresponding packed data operation mask bit of the second packed data operation mask is zero. Otherwise, the second flag, or other second processor state element, is modified to a fourth value, which is different than the third value. In some embodiments, the third value is binary one and the fourth value is binary zero, although this is just one possible convention and is not required. A state of the processor or apparatus is modified based on the result of the comparison at block 533.

The method 530 has been shown and described in a basic form, although operations may optionally be added to and/or removed from the methods. For example, other embodiments may perform the operation of block 532 without performing the operation of block 533. Still other embodiments may perform the operation of block 533 without performing the operation of block 532. In still other embodiments, the method may include additional operations. For example, in some embodiments, the method may further include modifying a plurality of other flags, or a plurality of other processor state elements, although this is not required. For example, in some embodiments, the method may include clearing or setting to binary zero at least a plurality of, or all of, a sign flag, a parity flag, an overflow flag, and an adjust flag, although this is not required. These particular flags are not required. Other embodiments may use fewer, different, or additional flags. In some embodiments, these flags may be modified regardless of the outcome of the comparisons implemented through the instruction. In addition, the particular illustrated order of the operations is not required. For example, alternate embodiments may perform the operations of blocks 532 and 533 in the reverse of the order illustrated, at the same time, partly at the same time, etc.

The illustrated method includes operations that are visible from outside a processor or instruction processing apparatus (e.g., visible from a software perspective). In other embodiments, the method may optionally include one or more operations occurring internally within the processor. By way of example, the instructions may be fetched, and then decoded, translated, emulated, or otherwise converted, into one or more other instructions or control signals. The source operands may be accessed and/or received. An execution unit may be enabled to perform the operation specified by the instruction, and may perform the operation (e.g., microarchitectural operations to implement the operations of the instructions may be performed). In some embodiments, the implementation of the operations may include performing a bitwise logical AND operation on the sources, performing a bitwise logical NOT on the bits of the second packed data operation mask, performing a bitwise logical and of the first packed data operation mask with the complement of the second packed data operation mask, checking the results of the AND operations to determine if all result bits are zero, etc. Different microarchitectural ways of performing the operation are contemplated.

Figure 5B:
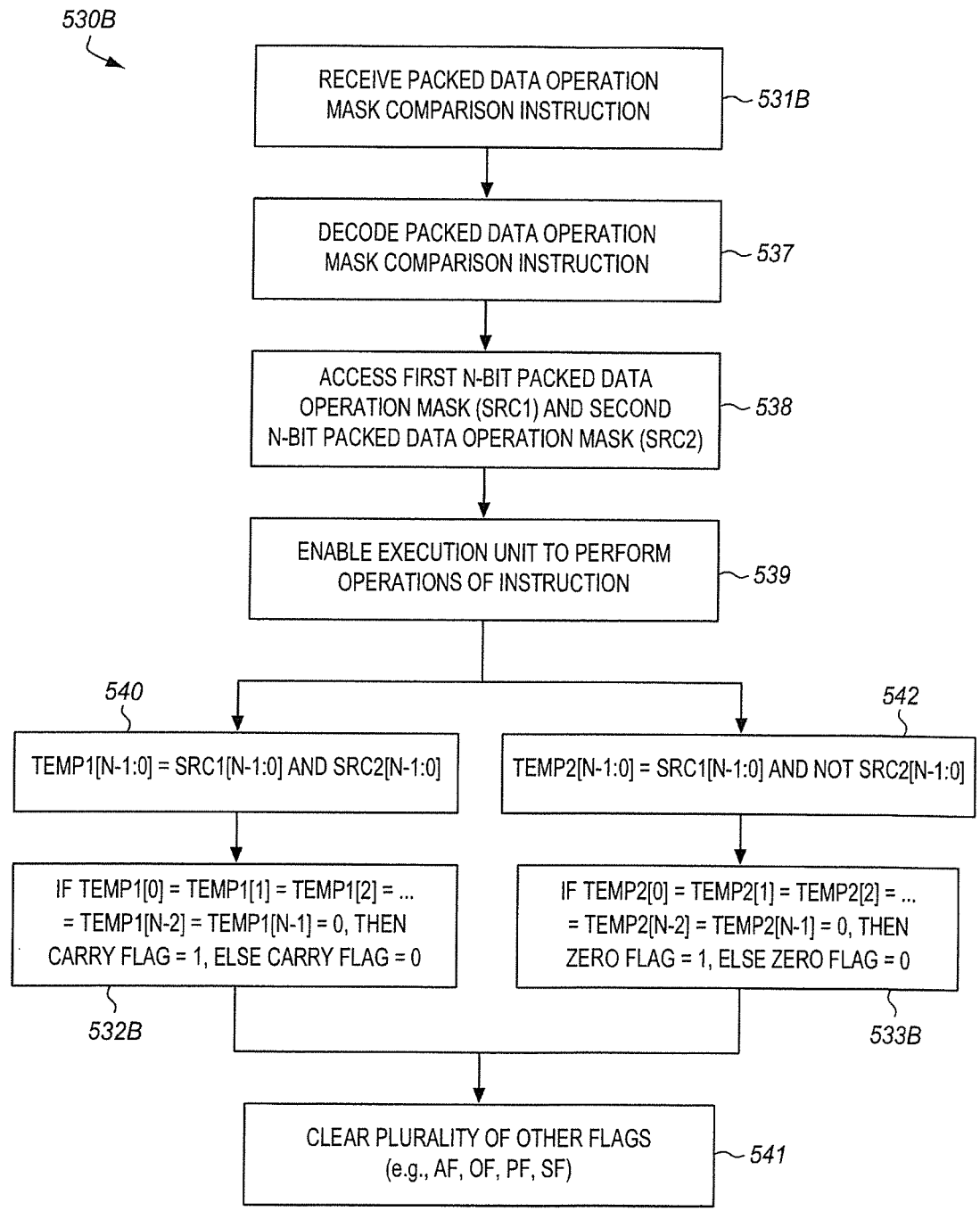
FIG. 5B is a block flow diagram of an embodiment of a detailed example method of processing an embodiment of a packed data operation mask comparison instruction.

FIG. 5B is a block flow diagram of an embodiment of a detailed example method 530B of processing an embodiment of a packed data operation mask comparison instruction. In various embodiments, the method may be performed by a general-purpose processor, a special-purpose processor (e.g., a graphics processor or a digital signal processor), or another type of digital logic device or instruction processing apparatus.

The method includes receiving the packed data operation mask comparison instruction, at block 531B. The packed data operation mask comparison instruction is decoded at block 537. At block 538, a first N-bit packed data operation mask (SRC1[N-1:0]) and a second packed data operation mask (SRC2[N-1:0]) are accessed (e.g., from a set of packed data operation mask registers). In various example embodiments, the N-bit masks may be 8-bit masks, 16-bit masks, 32-bit masks, or 64-bit masks. An execution unit is enabled to perform the operations of the packed data operation mask comparison instruction, at block 539. In embodiments, this may be done either with our without the assistance of microcode.

At block 540, the first N-bit packed data operation mask (SRC1[N-1:0]) is bitwise logically AND'd with the second N-bit packed data operation mask (SRC2[N-1:0]) and the result is provided to TEMP1[N-1:0]. In one aspect, TEMP1[N-1:0] may represent a temporary register in which the result bits are temporarily stored temporarily. In another aspect, TEMP1[N-1:0] may represent circuitry (e.g., latches) through which the result bits are provided without actually being stored in a register.

At block 532B, a determination is made based on a comparison of the result bits TEMP1[N-1:0] and a flag (e.g., in this case the carry flag) is modified based on the determination and/or comparison. In the illustrated embodiment, a determination is made whether all of TEMP1[0], TEMP1[1], through TEMP1[N-1] are equal to binary zero. If this is the case, then the carry flag is set to binary one. Otherwise, if at least one of TEMP1[0] through TEMP1[N-1] is not equal to binary zero, then the carry flag is cleared to binary zero.

At block 542, the first N-bit packed data operation mask (SRC1[N-1:0]) is bitwise logically AND'd with the logical NOT or complement of the second N-bit packed data operation mask (SRC2[N-1:0]) and the result is provided to TEMP2[N-1:0]. As before, TEMP2[N-1:0] may or may not store the result bits.

At block 533B, a determination is made based on a comparison of the result bits TEMP2[N-1:0] and a different flag (e.g., in this case the zero flag) is modified based on the determination and/or comparison. In the illustrated embodiment, a determination is made whether all of TEMP2[0], TEMP2[1], through TEMP2[N-1] are equal to binary zero. If this is the case, then the zero flag is set to binary one. Otherwise, if at least one of TEMP2[0] through TEMP2[N-1] is not equal to binary zero, then the zero flag is cleared to binary zero.

At block 541, a plurality of other architectural flags may optionally be modified. For example, in some embodiments, one or more, a plurality, or all of a sign flag (SF), a parity flag (PF), an overflow flag (OF), and an adjust flag (AF) may be cleared to zero. This is optional and not required. Moreover, different flags, a subset of these flags, or more flags may optionally be modified.

Figure 6:
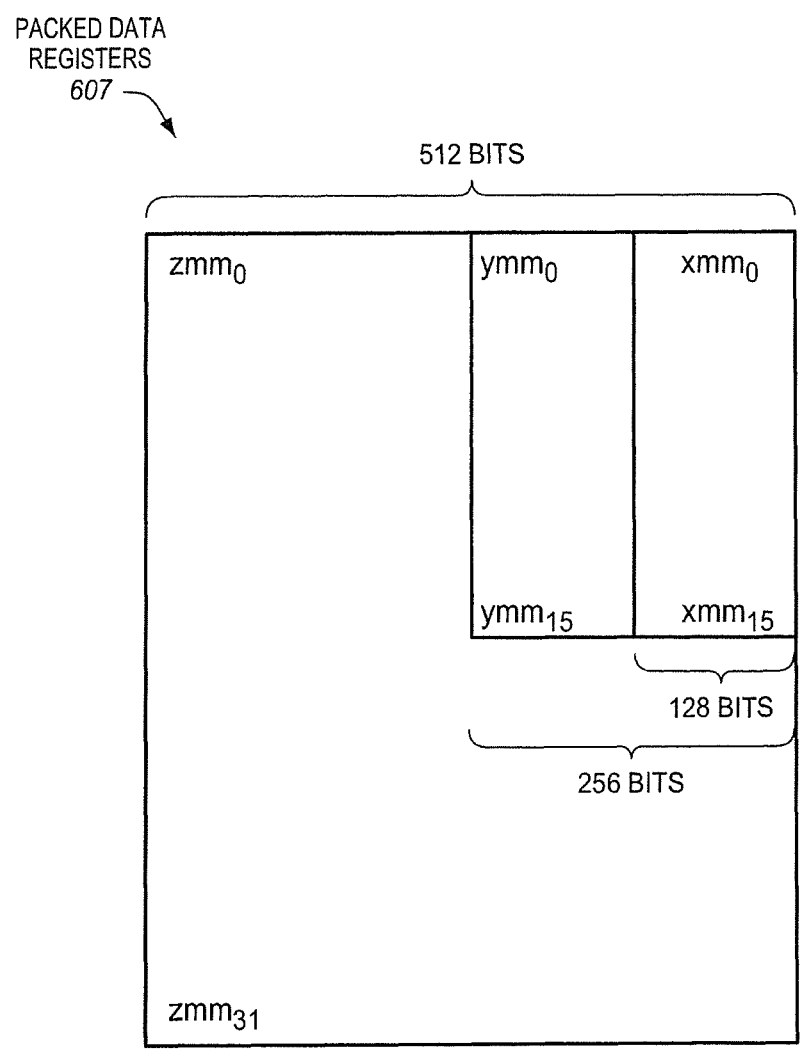
FIG. 6 is a block diagram of an example embodiment of a suitable set of packed data registers.

FIG. 6 is a block diagram of an example embodiment of a suitable set of packed data registers 607. The illustrated packed data registers include thirty-two 512-bit wide packed data or vector registers. These thirty-two 512-bit wide registers are labeled ZMM0 through ZMM31. In the illustrated embodiment, the lower order 256-bits of the lower sixteen of these registers, namely ZMM0-ZMM15, are aliased or overlaid on respective 256-bit wide packed data or vector registers labeled YMM0 -YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit wide registers ZMM0 through ZMM31 are operable to hold 512-bit packed data, 256-bit packed data, or 128-bit packed data. The 256-bit wide registers YMM0-YMM15 are operable to hold 256-bit packed data, or 128-bit packed data. The 128-bit wide registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 7:
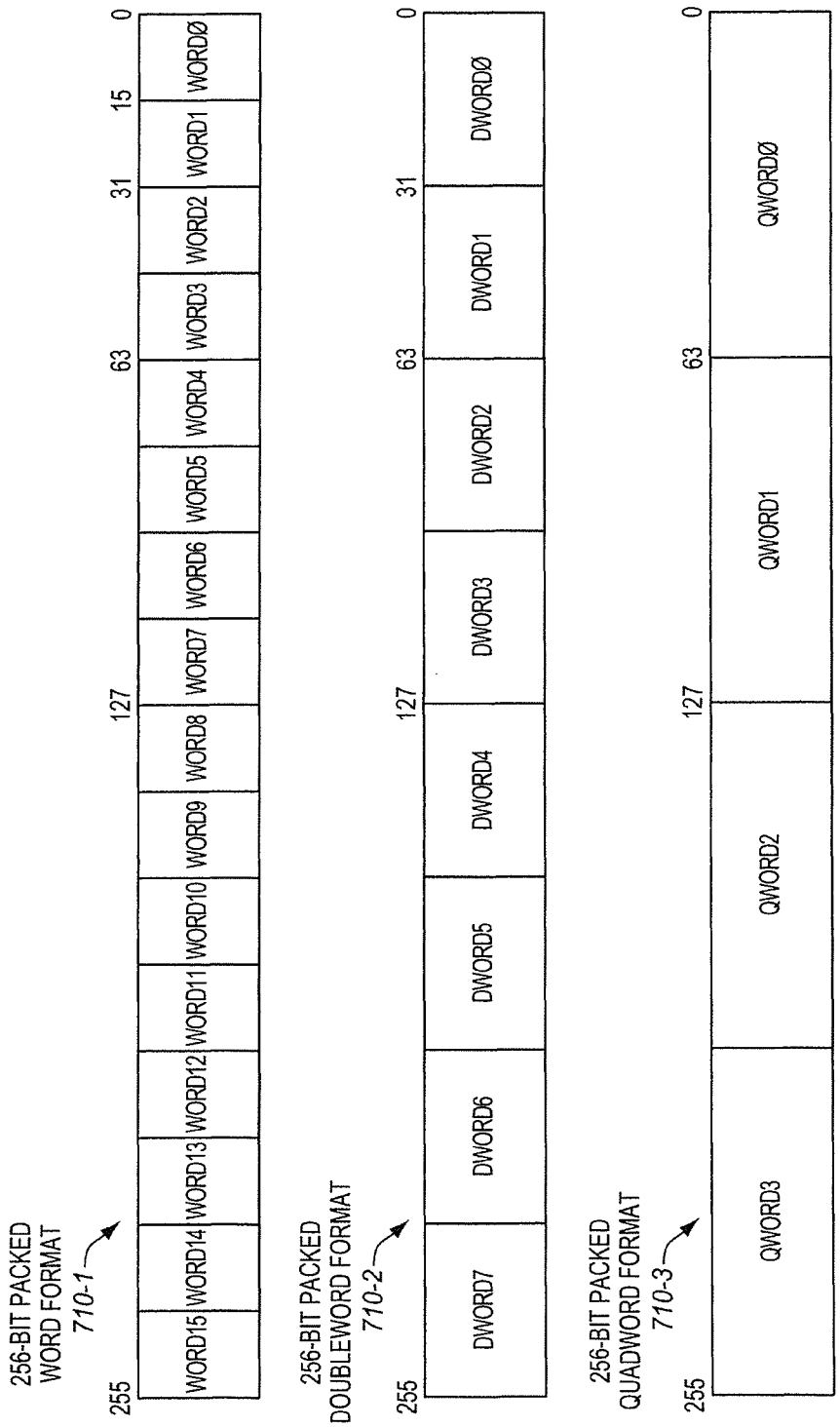
FIG. 7 is a block diagram illustrating several example embodiments of suitable packed data formats.

FIG. 7 is a block diagram illustrating several example embodiments of suitable packed data formats. A 256-bit packed word format 710-1 is 256-bits wide and includes sixteen 16-bit wide word data elements. The sixteen 16-bit word data elements are labeled in the illustration from least to most significant bit positions as WORD0 through WORD15. A 256-bit packed doubleword format 710-2 is 256-bits and includes eight 32-bit doubleword (dword) data elements. The eight 32-bit doubleword data elements are labeled in the illustration from least to most significant bit positions as DWORD0 through DWORD7. A 256-bit packed quadword format 710-3 is 256-bits and includes four 64-bit quadword data elements. The four 64-bit quadword data elements are labeled in the illustration from the least to most significant bit positions as QWORD0 through QWORD3.

Other packed data formats are also suitable. For example, other suitable 256-bit packed data formats include 256-bit packed 8-bit byte format, 256-bit packed 32-bit single precision floating point format, and 256-bit packed 64-bit double precision floating point format. The single and double precision floating point formats may respectively appear similar to the illustrated doubleword format 710-2 and quadword format 710-3, although the meaning/interpretation of the bits within the data elements may be different. Moreover, packed data formats either larger and/or smaller than 256-bits are also suitable. For example, 512-bit (or larger) packed data formats and/or 128-bit (or smaller) packed data formats of the aforementioned data types are also suitable. In general, the 512-bit packed data formats may have twice as many data elements as the 256-bit packed data formats for the same data type, while the 128-bit packed data formats may have half as many data elements as the 256-bit packed data formats for the same data type. Generally, the number of packed data elements is equal to the size in bits of the packed data divided by the size in bits of the packed data elements.

Figures 8, 9:
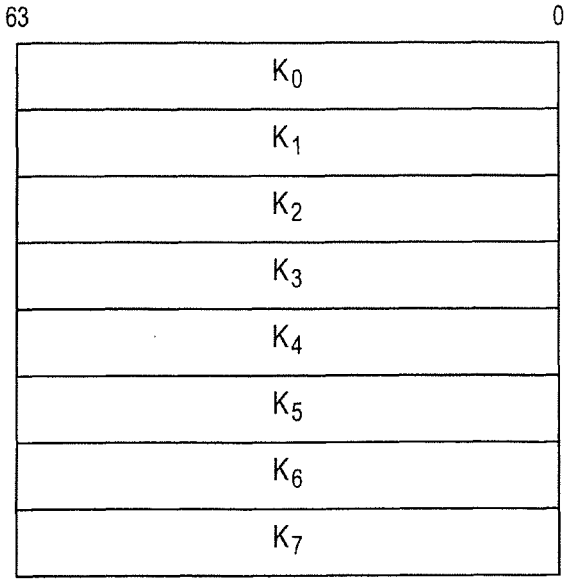
FIG. 8 is a table illustrating that the number of packed data operation mask bits depends upon the packed data width and the packed data element width.
FIG. 9 is a block diagram of an example embodiment of a suitable set of packed data operation mask registers.

FIG. 8 is a table illustrating that the number of packed data operation mask bits 834 depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible.

As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits.

FIG. 9 is a block diagram of an example embodiment of a suitable set of packed data operation mask registers 908. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits wide. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit. Various different types of registers are suitable as long as they are capable of storing and providing data as described herein. Examples of suitable registers include, but are not limited to, dedicated physical registers, dynamically allocated physical registers using register renaming, and combinations thereof.

In some embodiments, the packed data operation mask registers 908 may be a separate, dedicated set of architectural registers. In some embodiments, the instructions may encode or specify the packed data operation mask registers in different bits or one or more different field combinations of an instruction format than that used to encode or specify other types of registers (e.g., packed data registers 107 of FIG. 1). By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

Figure 10:
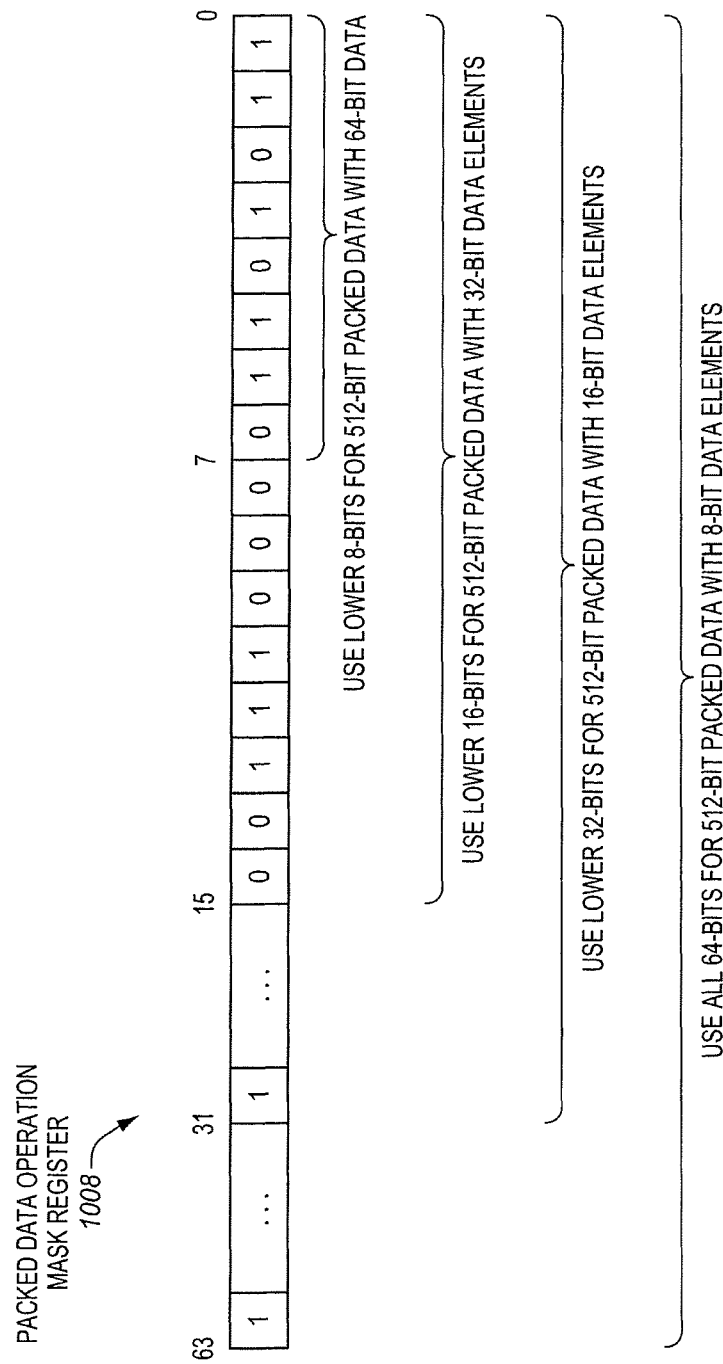
FIG. 10 is a diagram illustrating an example embodiment of a packed data operation mask register and showing that the number of bits that are used as a packed data operation mask and/or for masking depends upon the packed data width and the data element width.

FIG. 10 is a diagram illustrating an example embodiment of a packed data operation mask register 1008 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits.

Several illustrative examples are shown. Namely, when the packed data width is 512-bits and the packed data element width is 64-bits, then only the lowest-order 8-bits of the register are used as the packed data operation mask. When the packed data width is 512-bits and the packed data element width is 32-bits, then only the lowest-order 16-bits of the register are used as the packed data operation mask. When the packed data width is 512-bits and the packed data element width is 16-bits, then only the lowest-order 32-bits of the register are used as the packed data operation mask. When the packed data width is 512-bits and the packed data element width is 8-bits, then all 64-bits of the register are used as the packed data operation mask. In accordance with the illustrated embodiment, a masked packed data instruction may access and/or utilize only the number of lowest order or least significant bits of the register used for the packed data operation mask based on that instructions associated packed data width and data element width.

In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however the same principle applies for other packed data widths, such as, for example, 256-bit and 128-bit widths. As previously mentioned, the use of a 64-bit packed data operation mask register is not required.

Listed below are various particular example embodiments of packed data operation mask comparison instructions and operations thereof. In these figures, SRC is a first source of a first packed data operation mask, DEST is a second source of a second packed data operation mask, the symbol typically represents storing except for storing in TEMP is not required as discussed above. In some embodiments, SRC and DEST are each packed data operation mask registers.

For each of these instructions the operation may be to modify ZF and CF depending on bitwise AND and ANDN of two packed data operation masks. The operations may perform a bitwise comparison of bits of the first destination operand (DEST) and corresponding bits of the source operand (SRC). If the bitwise AND of the SRC bits with the DEST bits produces all zeros, then the ZF is set, else the ZF is cleared. If the bitwise AND of the inverted SRC bits with the DEST bits produces all zeros, then the CF is set, else the CF is cleared. In VEX-encoded versions, VEX.vvvv may be 1111b.

Figure 11:
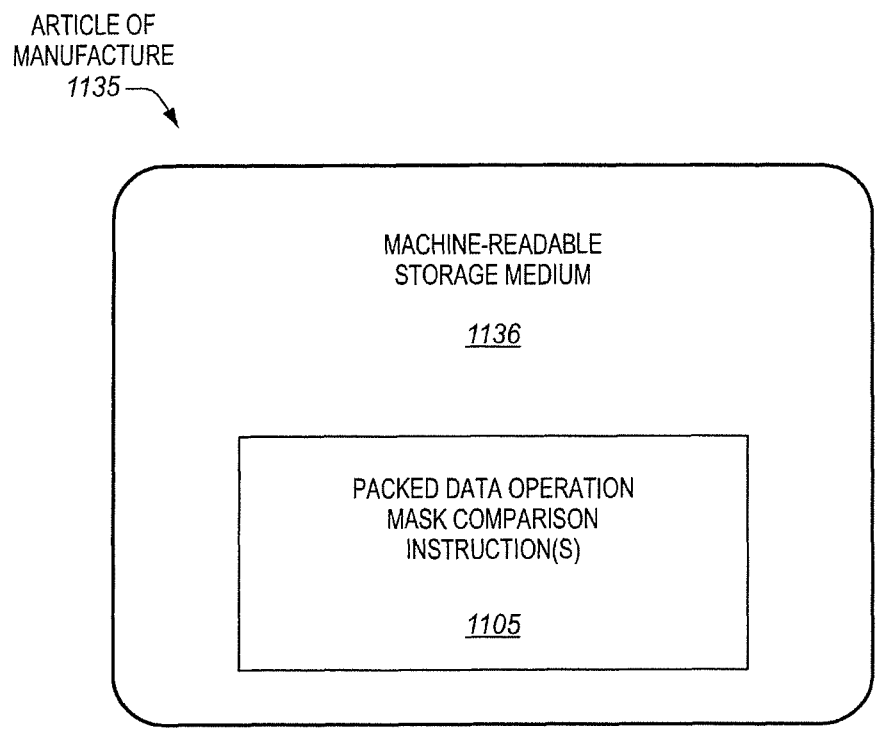
FIG. 11 is a block diagram of an article of manufacture (e.g., a computer program product) including a machine-readable storage medium storing a packed data operation mask comparison instruction.

KTESTB - Byte Bit Test Masks and Set Flags
TEMP[7:0] ← SRC[7:0] AND DEST[7:0]
IF (TEMP[0]=TEMP[1]=TEMP[2]=TEMP[3]= ... =TEMP[6]=
TEMP[7]=0)
  THEN ZF ← 1;
  ELSE ZF ← 0;
TEMP[7:0] ← SRC[7:0] AND NOT DEST[7:0]
IF (TEMP[0]=TEMP[1]=TEMP[2]=TEMP[3]= ... =TEMP[6]=
TEMP[7]=0)
  THEN CF ← 1;
  ELSE CF ← 0;
DEST (unmodified)
AF ← OF ← PF ← SF ← 0;
KTESTW - Word Bit Test Masks and Set Flags
TEMP[15:0] ← SRC[15:0] AND DEST[15:0]
IF (TEMP[0]=TEMP[1]=TEMP[2]=TEMP[3]= ... =TEMP[14]=
TEMP[15]=0)
  THEN ZF ← 1;
  ELSE ZF ← 0;
TEMP[15:0] ← SRC[15:0] AND NOT DEST[15:0]
IF (TEMP[0]=TEMP[1]=TEMP[2]=TEMP[3]= ... =TEMP[14]=
TEMP[15]=0)
  THEN CF ← 1;
  ELSE CF ← 0;
DEST (unmodified)
AF ← OF ← PF ← SF ← 0;
KTESTD - Doubleword Bit Test Masks and Set Flags
TEMP[31:0] ← SRC[31:0] AND DEST[31:0]
IF (TEMP[0]=TEMP[1]=TEMP[2]=TEMP[3]= ... =TEMP[30]=
TEMP[31]=0)
  THEN ZF ← 1;
  ELSE ZF ← 0;
TEMP[31:0] ← SRC[31:0] AND NOT DEST[31:0]
IF (TEMP[0]=TEMP[1]=TEMP[2]=TEMP[3]= ... =TEMP[30]=
TEMP[31]=0)
  THEN CF ← 1;
  ELSE CF ← 0;
DEST (unmodified)
AF ← OF ← PF ← SF ← 0;
KTESTQ - Quadword Bit Test Masks and Set Flags
TEMP[63:0] ← SRC[63:0] AND DEST[63:0]
IF (TEMP[0]=TEMP[1]=TEMP[2]=TEMP[3]= ... =TEMP[62]=
TEMP[63]=0)
  THEN ZF ← 1;
  ELSE ZF ← 0;
TEMP[63:0] ← SRC[63:0] AND NOT DEST[63:0]
IF (TEMP[0]=TEMP[1]=TEMP[2]=TEMP[3]= ... =TEMP[62]=
TEMP[63]=0)
  THEN CF ← 1;
  ELSE CF ← 0;
DEST (unmodified)
AF ← OF ← PF ← SF ← 0;

FIG. 11 is a block diagram of an article of manufacture (e.g., a computer program product) 1135 including a machine-readable storage medium 1136. In some embodiments, the machine-readable storage medium may be a tangible and/or non-transitory machine-readable storage medium. In various embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

The machine-readable storage medium stores one or more packed data operation mask comparison instructions 1105. Any of the instructions disclosed herein are suitable. Each of the packed data operation mask comparison instructions is to indicate a first packed data operation mask having a first plurality of packed data operation mask bits and is to indicate a second packed data operation mask having a second plurality of packed data operation mask bits. Each packed data operation mask bit of the first packed data operation mask corresponds to a packed data operation mask bit of the second packed data operation mask in a corresponding position.

Each of the packed data operation mask comparison instructions, if executed by a machine, is operable to cause the machine to perform one or more operations or methods as disclosed herein. In some embodiments, the operations may include performing a bitwise AND of each packed data operation mask bit of the first packed data operation mask with each corresponding packed data operation mask bit of the second packed data operation mask. In some embodiments, a first flag or other first processor state memory element (e.g., a zero flag) may be set to a first or a second value based on an outcome of the bitwise AND operation. In some embodiments, the operations may further include performing a bitwise AND of each packed data operation mask bit of the first packed data operation mask with a bitwise NOT of each corresponding packed data operation mask bit of the second packed data operation mask. In some embodiments, a second flag or other second processor state memory element (e.g., a carry flag) may be set to a third or a fourth value based on an outcome of the bitwise AND NOT operation.

Moreover, other instructions may be stored on the medium. For example, these may include masked packed data instructions that indicate packed data operation masks and/or mask registers as predicate operands. As another example, these may include branch, jump, conditional move instructions, or the like, which may branch, jump, or conditionally move around in a program flow or alter the program flow based on the performed bitwise AND and AND NOT operations and/or based on modifications to architectural state resulting from these bitwise AND and AND NOT operations.

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, nettops, set-top boxes, cellular phones, video game controllers, etc.

The packed data operation mask comparison instructions disclosed herein are general-purpose instructions that have general uses and that may be used for various different purposes. Those skilled in the art will device a number of different ways to use the results of the comparisons and/or the modifications to the processor state resulting from, or indicative of, the comparisons. By way of example, possible uses of these instructions include, but are not limited to, comparing two unknown packed data operation masks, comparing an unknown packed data operation mask with a known or predetermined packed data operation mask, using results of the comparisons to inform program decisions, using results of the comparisons to alter program flow, using results of the comparisons to perform conditional branching, jumping, or otherwise conditionally move around in program code, perform branch support based on the results of the comparisons, determine when to perform a branch based on the results of the comparisons, perform inform if-then-else types of decisions, etc. In some embodiments, a packed data operation mask comparison instruction may be followed by a conditional jump, branch, or other program flow movement instruction that conditionally moves around in program code or alters program flow based on results of the comparisons associated with the packed data operation mask comparison instruction (e.g., based on one or more flags modified by the instruction).

One area in which these instructions are useful is in efficient vectorization of scalar operations or code. The packed data operation masks may be used to predicate whether or not operations are to be performed on individual data elements of packed data. There commonly are situations where all of the elements either will or will not need to have the operation performed on them. Masked packed data operations tend to have slightly less performance than un-masked packed data operations. Performance may be achieved by replacing masked packed data operations with un-masked packed data operations when appropriate to do so (e.g., when the operation is to be performed on all of the data elements of packed data). The packed data operation mask comparison instructions disclosed herein are useful to help inform such decisions (e.g., to determine when to perform unmasked instead of masked operations). For example, the results of the packed data operation mask comparison instructions may help to determine when to jump over or around certain operations that don't need to be performed and/or to jump to a given type of operation (e.g., an unpredicated operation) instead of to another type of operation (e.g., a predicated operation). For example, the flags may indicate whether or not there are elements in one or more packed data on which an operation needs to be performed. If the flags indicate that there are no elements on which the operation needs to be performed, then you could jump or over or around the operation without performing it. Alternatively, if the flags indicate the operation needs to be performed on all data elements of packed data then an un-masked operation rather than a masked operation may be performed. For example, if all of the bits in a mask are set, then it wouldn't be necessary to perform a predicated operation, but rather an un-predicated operation may be performed. Advantageously, this may help to improve performance.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 1811; and see Intel® Advanced Vector Extensions Programming Reference, June 1811).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12A illustrates an exemplary AVX instruction format including a VEX prefix 1182, real opcode field 1210, Mod R/M byte 1240, SIB byte 1250, displacement field 1262, and IMM8 1272. FIG. 12B illustrates which fields from FIG. 12A make up a full opcode field 1274 and a base operation field 1242. FIG. 12C illustrates which fields from FIG. 12A make up a register index field 1244.

VEX Prefix (Bytes 0-2) 1182 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1185 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1193 (VEX byte 1, bits [4:0]—mmmmm) includes content to encode an implied leading opcode byte. W Field 1264 (VEX byte 2, bit [7]—W)—is represented by the notation VEX.W, and provides different functions depending on the instruction. The role of VEX.vvvv 1198 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1268 Size field (VEX byte 2, bit [2]—L)=0, it indicates 128 bit vector; if VEX.L=1, it indicates 256 bit vector. Prefix encoding field 1205 (VEX byte 2 bits [1:0]—pp) provides additional bits for the base operation field.

Real Opcode Field 1210 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254 (bits [5-3]) and SIB.bbb 1256 (bits [2-0]) have been previously referred to with regard to the register indexes Xxxx and Bbbb.

The Displacement Field 1262 and the immediate field (IMM8) 1272 contain address data.

Exemplary Register Architecture

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 14 zmm registers are overlaid on registers ymm0-14. The lower order 128 bits of the lower 14 zmm registers (the lower order 128 bits of the ymm registers) are overlaid on registers xmm0-13.

Write mask registers 1313—in the embodiment illustrated, there are 8 write mask registers (k0 through k7), each 64 bits in size. In an alternate embodiment, the write mask registers 1313 are 14 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R13.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the applica- Exemplary Core Architectures
In-Order and Out-of-Order Core Block Diagram FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1412, an execute stage 1414, a write back/memory write stage 1416, an exception handling stage 1420, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1412; the execution cluster 1460 perform the execute stage 1414; 6) the memory unit 1470 and the physical register file(s) unit(s) 1458 perform the write back/memory write stage 1416; 7) various units may be involved in the exception handling stage 1420; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 15B:
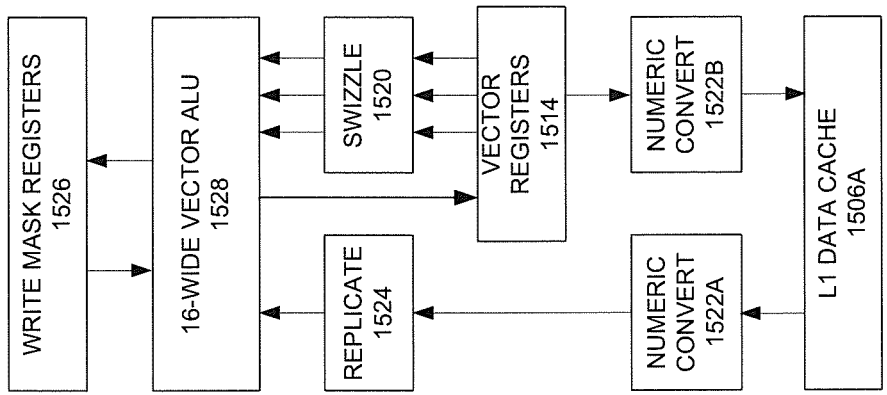
FIG. 15B is an expanded view of part of the processor core in FIG. 15A according to embodiments of the invention.
Figure 15A:
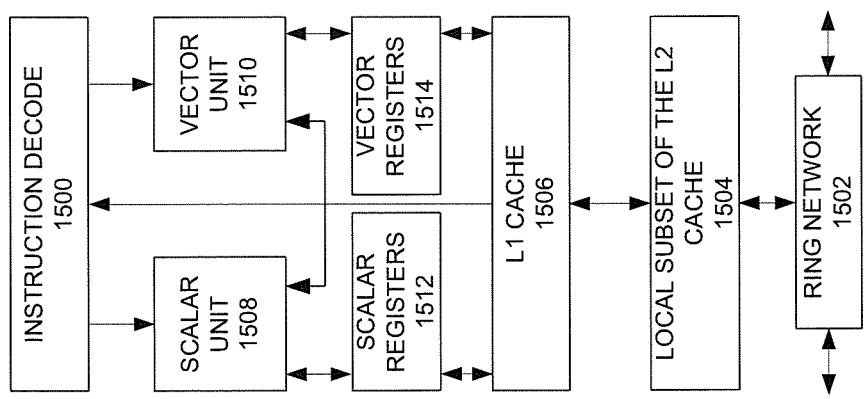
FIG. 15A is a block diagram of a single processor core, along with its connection to the on-die interconnect network and with its local subset of the Level 2 (L2) cache, according to embodiments of the invention.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1512) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1512. Specifically, the vector unit 1510 is a 14-wide vector processing unit (VPU) (see the 14-wide ALU 1528), which executes one or more of integer, single-precision float, and double-precision float instructions. The VPU supports swizzling the register inputs with swizzle unit 1518, numeric conversion with numeric convert units 1520A-B, and replication with replication unit 1524 on the memory input. Write mask registers 1526 allow predicating resulting vector writes.

Processor with Integrated Memory Controller and Graphics

Figure 16:
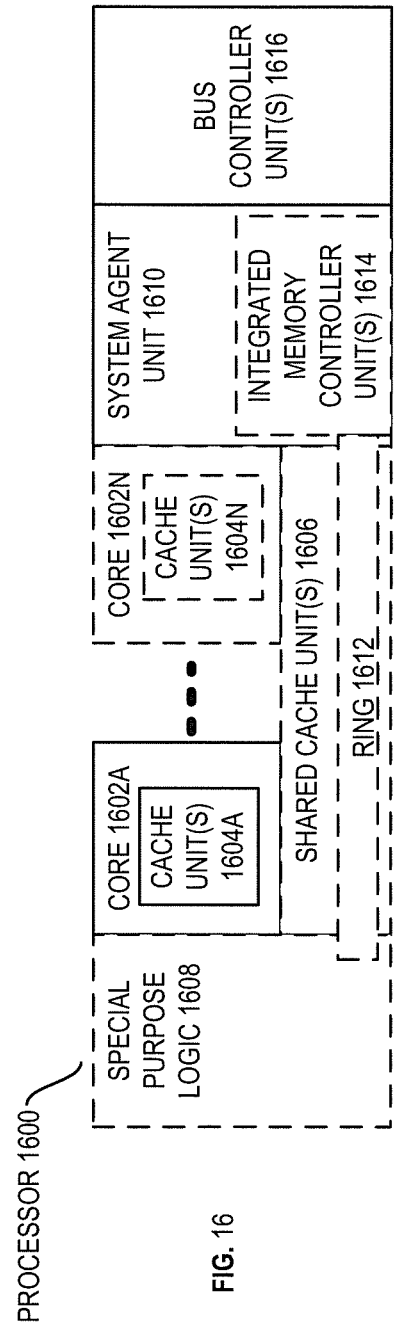
FIG. 16 is a block diagram of a processor that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1614, while the optional addition of the dashed lined boxes illustrates an alternative processor 1600 with multiple cores 1602A-N, a set of one or more integrated memory controller unit(s) 1612 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1612. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1612, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
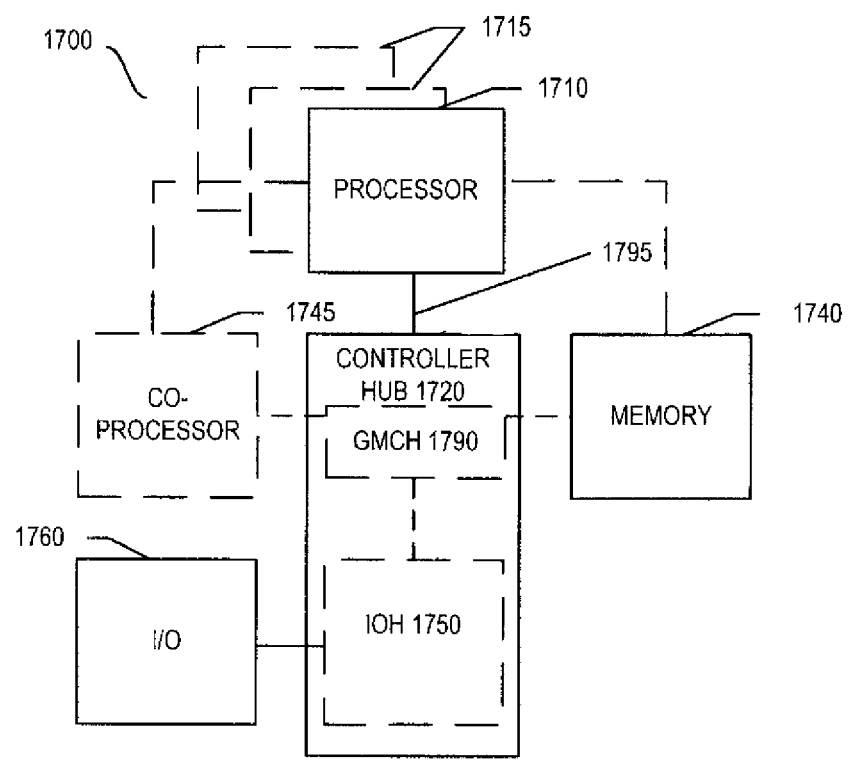
FIG. 17 shown is a block diagram of a system 1700 in accordance with one embodiment of the present invention.

Referring now to FIG. 17, shown is a block diagram of a system 1700 in accordance with one embodiment of the present invention. The system 1700 may include one or more processors 1710, 1713, which are coupled to a controller hub 1718. In one embodiment the controller hub 1718 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1718 in a single chip with the IOH 1750.

The optional nature of additional processors 1713 is denoted in FIG. 17 with broken lines. Each processor 1710, 1713 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1718 communicates with the processor(s) 1710, 1713 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1718 may include an integrated graphics accelerator.

There can be a variety of differences between the physical resources 1710, 1713 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
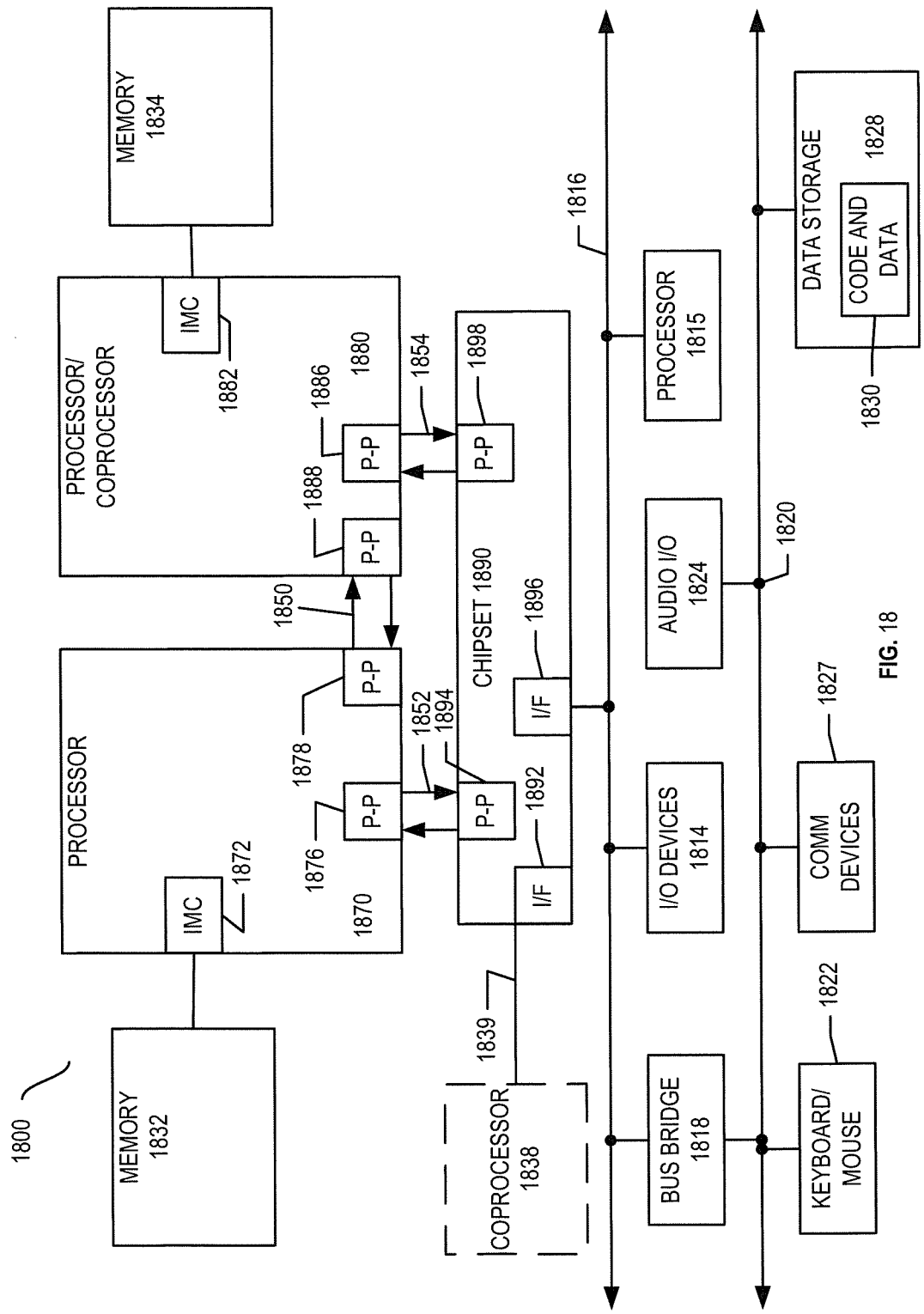
FIG. 18 shown is a block diagram of a first more specific exemplary system in accordance with an embodiment of the present invention.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1713, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1814 via an interface 1896. In one embodiment, first bus 1814 may be a Peripheral Component Interconnect (PCI) bus, or a bus such as a PCI Express bus or another third generation I/O interconnect bus, although the scope of the present invention is not so limited.

As shown in FIG. 18, various I/O devices 1812 may be coupled to first bus 1814, along with a bus bridge 1816 which couples first bus 1814 to a second bus 1818. In one embodiment, one or more additional processor(s) 1813, such as coprocessors, high-throughput MIC processors, GPGPU's, accelerators (such as, e.g., graphics accelerators or digital signal processing (DSP) units), field programmable gate arrays, or any other processor, are coupled to first bus 1814. In one embodiment, second bus 1818 may be a low pin count (LPC) bus. Various devices may be coupled to a second bus 1818 including, for example, a keyboard and/or mouse 1820, communication devices 1827 and a storage unit 1828 such as a disk drive or other mass storage device which may include instructions/code and data 1830, in one embodiment. Further, an audio I/O 1824 may be coupled to the second bus 1818.

Note that other architectures are possible. For example, instead of the point-to-point architecture of FIG. 18, a system may implement a multi-drop bus or other such architecture.

Figure 19:
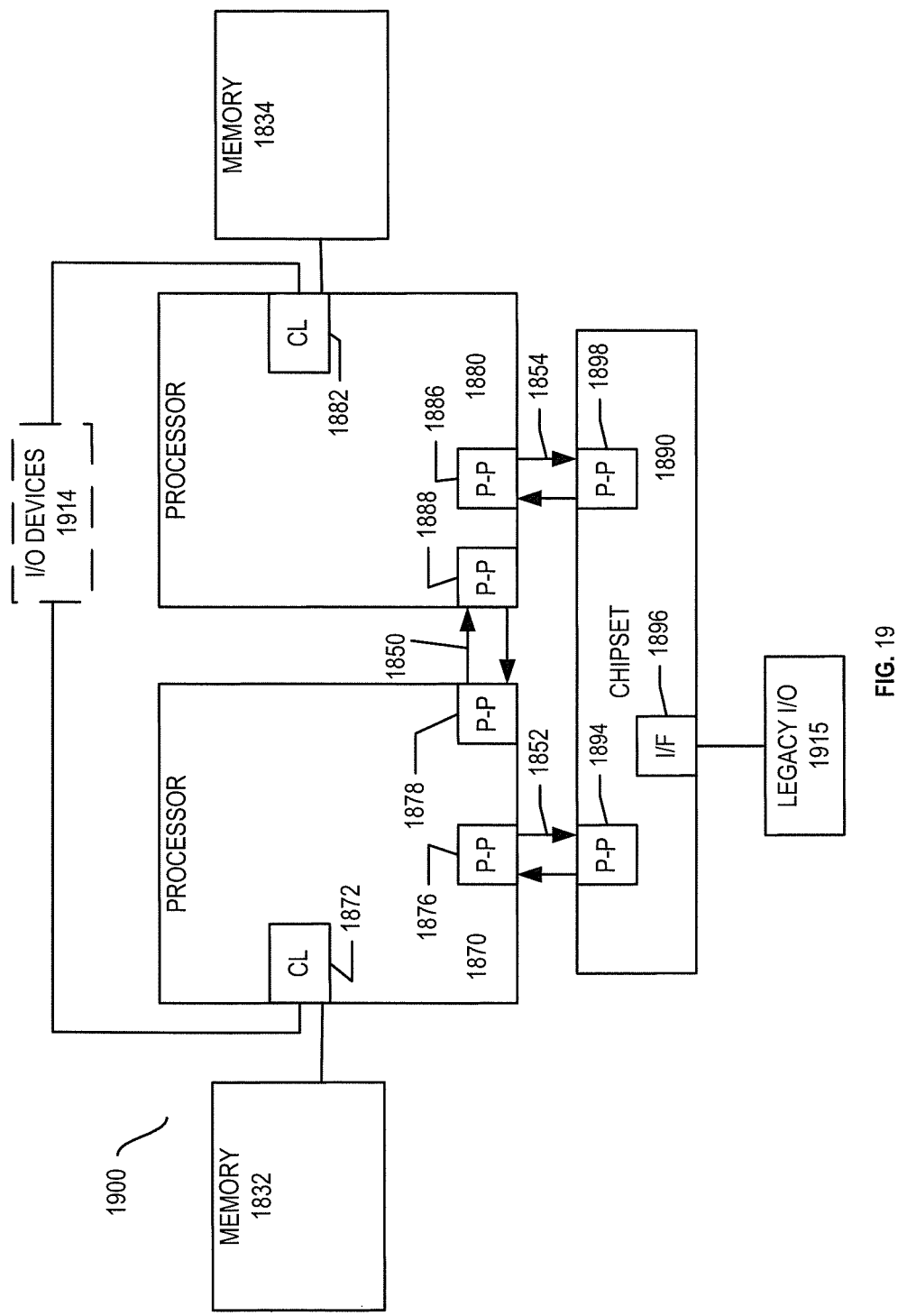
FIG. 19 shown is a block diagram of a second more specific exemplary system in accordance with an embodiment of the present invention.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1912 are also coupled to the control logic 1872, 1882. Legacy I/O devices 1913 are coupled to the chipset 1890.

Figure 20:
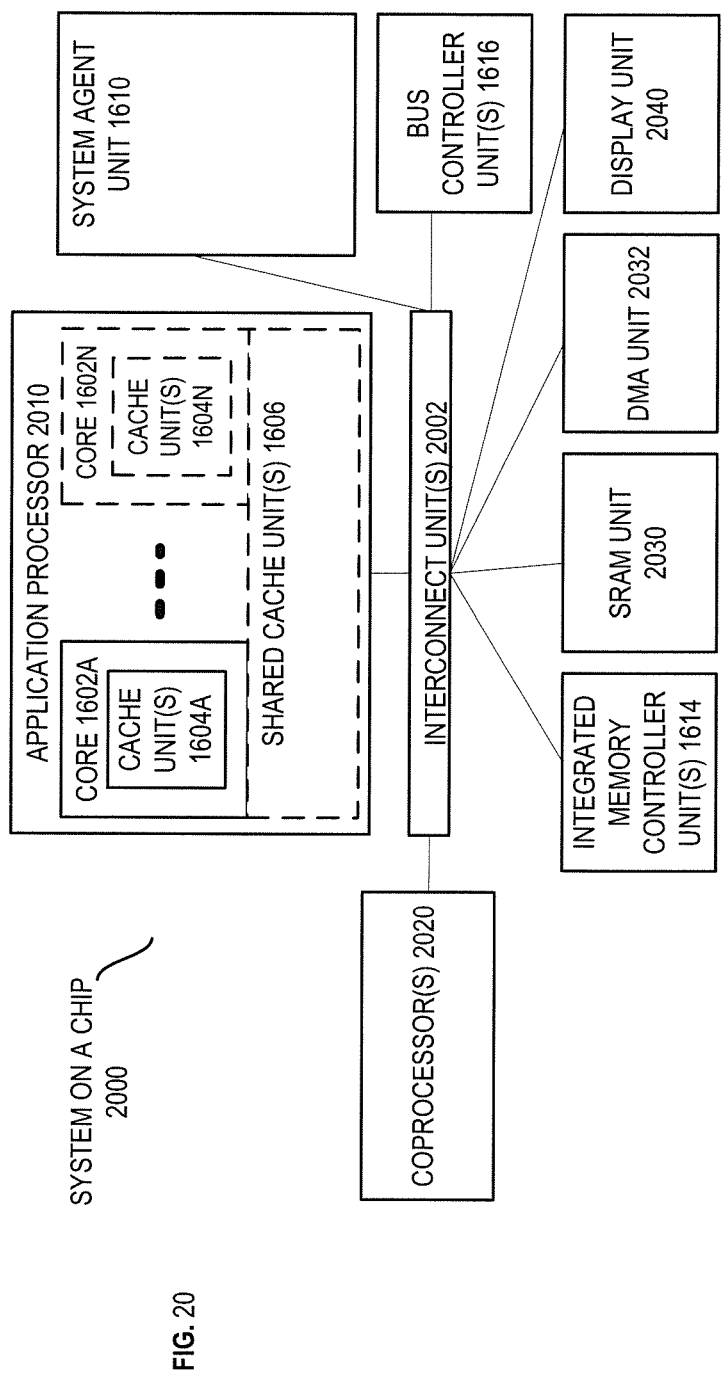
FIG. 20 shown is a block diagram of a SoC in accordance with an embodiment of the present invention.

Referring now to FIG. 20, shown is a block diagram of a SoC 1980 in accordance with an embodiment of the present invention. Similar elements in FIG. 16 bear like reference numerals. Also, dashed lined boxes are optional features on more advanced SoCs. In FIG. 20, an interconnect unit(s) 1982 is coupled to: an application processor 2190 which includes a set of one or more cores 182A-N and shared cache unit(s) 1606; a system agent unit 1610; a bus controller unit(s) 1614; an integrated memory controller unit(s) 1612; a set or one or more coprocessors 2198 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2198 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
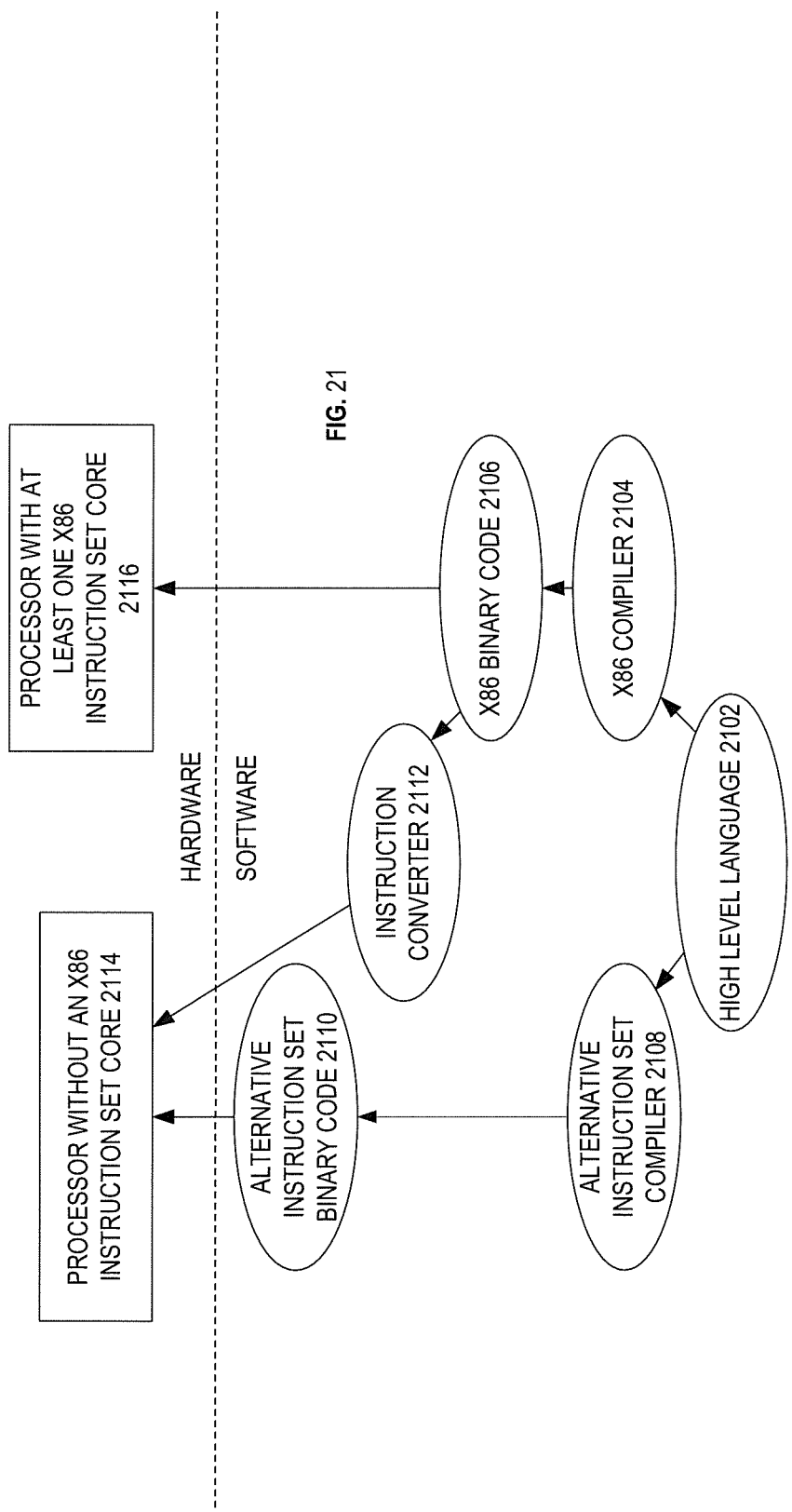
FIG. 21 is a block diagram contrasting the use of a software instruction converter to convert binary instructions in a source instruction set to binary instructions in a target instruction set according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2114. The processor with at least one x86 instruction set core 2114 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2114. Similarly, FIG. 21 shows the program in the high level language 2102 may be compiled using an alternative instruction set compiler 2108 to generate alternative instruction set binary code 2110 that may be natively executed by a processor without at least one x86 instruction set core 2112 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the X86 binary code 2106 into code that may be natively executed by the processor without an x86 instruction set core 2112. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

In the description and claims, the term "logic" may have been used. As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where multiple components have been shown and described, in some cases these multiple components may be incorporated into one component. Where a single component has been shown and described, in some cases this single component may be separated into two or more components.

Certain operations may be performed by hardware components and/or may be embodied in a machine-executable or circuit-executable instruction that may be used to cause and/or result in a hardware component (e.g., a processor, potion of a processor, circuit, etc.) programmed with the instruction performing the operations. The hardware component may include a general-purpose or special-purpose hardware component. The operations may be performed by a combination of hardware, software, and/or firmware. The hardware component may include specific or particular logic (e.g., circuitry potentially combined with software and/or firmware) that is operable to execute and/or process the instruction and store a result in response to the instruction (e.g., in response to one or more microinstructions or other control signals derived from the instruction).

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
receiving a packed data operation mask comparison instruction, the packed data operation mask comparison instruction indicating a first packed data operation mask having a first plurality of packed data operation mask bits and indicating a second packed data operation mask having a second plurality of packed data operation mask bits, each packed data operation mask bit of the first packed data operation mask corresponding to a packed data operation mask bit of the second packed data operation mask in a corresponding position;
modifying a first flag to a first value if a bitwise AND of each packed data operation mask bit of the first packed data operation mask with each corresponding packed data operation mask bit of the second packed data operation mask is zero, or otherwise modifying the first flag to a second value; and
modifying a second flag to a third value if a bitwise AND of each packed data operation mask bit of the first packed data operation mask with a bitwise NOT of each corresponding packed data operation mask bit of the second packed data operation mask is zero, or otherwise modifying the second flag to a fourth value.

2. The method of claim 1, wherein modifying the first flag comprises modifying a zero flag, and wherein the first value comprises binary one.

3. The method of claim 1, wherein modifying the second flag comprises modifying a carry flag, and wherein the third value comprises binary one.

4. The method of claim 1, further comprising modifying a plurality of other flags.

5. The method of claim 4, wherein modifying the plurality of the other flags comprises clearing at least a plurality of a sign flag, a parity flag, an overflow flag, and an adjust flag.

6. The method of claim 1, wherein receiving the instruction comprises receiving an instruction indicating a first packed data operation mask register having the first packed data operation mask and indicating a second packed data operation mask register having the second packed data operation mask.

7. The method of claim 1, wherein each bit of the first packed data operation mask corresponds to a different packed data element and is to be used to predicate whether a packed data operation is to be performed on the packed data element.

8. The method of claim 1, further comprising receiving a masked packed data instruction indicating the first packed data operation mask as a predicate operand.

9. The method of claim 1, further comprising altering program flow based at least in part on values of the first and second flags.

10. The method of claim 9, wherein altering the program flow based at least in part on the values of the first and second flags comprising determining to perform a masked operation or an unmasked operation on a packed data based at least in part on the values of the first and second flags.

11. An apparatus comprising:
a first packed data operation mask register to store a first packed data operation mask;
a second packed data operation mask register to store a second packed data operation mask; and
an execution unit coupled with the first and second packed data operation mask registers, the execution unit operable, as a result of a packed data operation mask comparison instruction indicating the first packed data operation mask register having a first plurality of packed data operation mask bits, indicating the second packed data operation mask register having a second plurality of packed data operation mask bits, where each packed data operation mask bit of the first packed data operation mask register corresponds to a packed data operation mask bit of the second packed data operation mask register in a corresponding position, to
modify a first architecturally-visible processor state element to a first value if a bitwise AND of each packed data operation mask bit of the first packed data operation mask register with each corresponding packed data operation mask bit of the second packed data operation mask register is zero, or otherwise modifying the first architecturally-visible processor state element to a second value, and
modify a second architecturally-visible processor state element to a third value if a bitwise AND of each packed data operation mask bit of the first packed data operation mask register with a bitwise NOT of each corresponding packed data operation mask bit of the second packed data operation mask register is zero, or otherwise modifying the second architecturally-visible processor state element to a fourth value.

12. The apparatus of claim 11, wherein the first architecturally-visible processor state element comprises a zero flag.

13. The apparatus of claim 12, wherein the first value comprises binary one and the second value comprises binary zero.

14. The apparatus of claim 11, wherein the second architecturally-visible processor state element comprises a carry flag.

15. The apparatus of claim 14, wherein the third value comprises binary one and the fourth value comprises binary zero.

16. The apparatus of claim 11, wherein the execution unit, as the result of the packed data operation mask comparison instruction, is further to modifying a plurality of other architecturally-visible processor state elements.

17. The apparatus of claim 16, wherein the execution unit, as the result of the packed data operation mask comparison instruction, is further to clear at least a plurality of a sign flag, a parity flag, an overflow flag, and an adjust flag.

18. The apparatus of claim 11, wherein each of the first and second pluralities of packed data operation mask bits is one of eight bits, sixteen bits, thirty-two bits, and sixty-four bits.

19. The apparatus of claim 11, wherein each of the first plurality of the packed data operation mask bits corresponds to a different packed data element.

20. The apparatus of claim 11, wherein the apparatus is also to execute a packed data instruction that indicates the first packed data operation mask register as a predicate operand to predicate a packed data operation on a packed data.

21. A system comprising:
an interconnect;
a processor coupled with the interconnect, the processor operable, as a result of a packed data operation mask comparison instruction indicating a first packed data operation mask having a first plurality of packed data operation mask bits, and indicating a second packed data operation mask having a second plurality of packed data operation mask bits, where each packed data operation mask bit of the first packed data operation mask corresponds to a packed data operation mask bit of the second packed data operation mask in a corresponding position, to
modify a first flag to a first value if a bitwise AND of each packed data operation mask bit of the first packed data operation mask with each corresponding packed data operation mask bit of the second packed data operation mask is zero, or otherwise modifying the first flag to a second value, and
modify a second flag to a third value if a bitwise AND of each packed data operation mask bit of the first packed data operation mask with a bitwise NOT of each corresponding packed data operation mask bit of the second packed data operation mask is zero, or otherwise modifying the second flag to a fourth value; and
a dynamic random access memory (DRAM) coupled with the interconnect.

22. The system of claim 21, wherein the first flag comprises a zero flag and the second flag comprises a carry flag, and wherein each of the first plurality of the packed data operation mask bits corresponds to a different packed data element.

23. An article of manufacture comprising:
a machine-readable storage medium including one or more solid materials, the machine-readable storage medium storing a packed data operation mask comparison instruction,
the packed data operation mask comparison instruction to indicate a first packed data operation mask having a first plurality of packed data operation mask bits and to indicate a second packed data operation mask having a second plurality of packed data operation mask bits, each packed data operation mask bit of the first packed data operation mask corresponding to a packed data operation mask bit of the second packed data operation mask in a corresponding position, and the packed data operation mask comparison instruction if executed by a machine operable to cause the machine to perform operations comprising:
performing a bitwise AND of each packed data operation mask bit of the first packed data operation mask with each corresponding packed data operation mask bit of the second packed data operation mask; and
performing a bitwise AND of each packed data operation mask bit of the first packed data operation mask with a bitwise NOT of each corresponding packed data operation mask bit of the second packed data operation mask.

24. The article of manufacture of claim 23, wherein the packed data operation mask comparison instruction, if executed by the machine, is further operable to cause the machine to perform operations comprising altering an architecturally visible state of the machine based on the bitwise AND and the bitwise AND NOT, and wherein the machine-readable storage medium further stores a packed data instruction that indicates the first packed data operation mask as a predicate operand.

25. The article of manufacture of claim 23, wherein the machine-readable storage medium further stores one or more instructions that if executed by the machine cause the machine to alter program flow based on comparisons associated with the bitwise AND and the bitwise AND NOT.

* * * * *

UNITED STATES PATENT AND TRADEMARK OFFICE
CERTIFICATE OF CORRECTION

| | | |
|---|---|---|
| PATENT NO. | : 9,244,687 B2 | Page 1 of 1 |
| APPLICATION NO. | : 13/977153 | |
| DATED | : January 26, 2016 | |
| INVENTOR(S) | : Bret L. Toll et al. | |

It is certified that error appears in the above-identified patent and that said Letters Patent is hereby corrected as shown below:

Specification

In column 1, line 10, delete "entitiled" and insert -- entitled --, therefor.

In column 1, line 12, delete "METHODS" and insert -- METHODS, --, therefor.

Signed and Sealed this
Twenty-sixth Day of April, 2016

Michelle K. Lee
*Director of the United States Patent and Trademark Office*